United States Patent
Whiffen

Patent Number: 6,151,566
Date of Patent: Nov. 21, 2000

[54] PIECEWISE CONTINUOUS CONTROL OF GROUNDWATER REMEDIATION

[76] Inventor: Greg Whiffen, 4 Albany Ave., Round Lake, N.Y. 12151-0516

[21] Appl. No.: 09/004,934

[22] Filed: Jan. 9, 1998

Related U.S. Application Data

[62] Division of application No. 08/829,915, Mar. 28, 1997, Pat. No. 5,813,798.

[51] Int. Cl.$^7$ .............................. G06G 7/48; G06F 17/50
[52] U.S. Cl. .................................................. 703/10; 703/5
[58] Field of Search ........................... 395/500.31, 500.3, 395/500.27; 703/10, 6, 9

[56] References Cited

U.S. PATENT DOCUMENTS

| | | |
|---|---|---|
| 4,755,304 | 7/1988 | Hallberg et al. . |
| 4,832,122 | 5/1989 | Corey et al. . |
| 4,846,934 | 7/1989 | Carberry . |
| 4,966,654 | 10/1990 | Carberry . |
| 5,022,786 | 6/1991 | Philo . |
| 5,180,503 | 1/1993 | Gorelick et al. . |
| 5,186,255 | 2/1993 | Corey .................................. 166/250.15 |
| 5,249,888 | 10/1993 | Braithwaite et al. . |
| 5,263,795 | 11/1993 | Corey et al. . |
| 5,286,141 | 2/1994 | Vigneri . |
| 5,302,286 | 4/1994 | Semprini et al. . |
| 5,318,698 | 6/1994 | Bernhardt . |
| 5,324,433 | 6/1994 | Grant et al. . |
| 5,326,703 | 7/1994 | Hazen et al. . |
| 5,345,034 | 9/1994 | Corey ....................................... 588/249 |
| 5,348,420 | 9/1994 | Bernhardt . |
| 5,352,276 | 10/1994 | Rentschler et al. . |
| 5,380,126 | 1/1995 | Bernhardt . |
| 5,383,747 | 1/1995 | Millan . |
| 5,384,048 | 1/1995 | Hazen et al ............................. 210/605 |
| 5,387,057 | 2/1995 | DeLoach . |
| 5,389,267 | 2/1995 | Gorelick et al. . |
| 5,405,509 | 4/1995 | Lomasney et al. . |
| 5,468,088 | 11/1995 | Shoemaker et al. ..................... 166/245 |
| 5,468,097 | 11/1995 | Bernhardt . |
| 5,487,622 | 1/1996 | Cherry et al. . |
| 5,489,370 | 2/1996 | Lomasney et al. . |
| 5,509,760 | 4/1996 | Schriefer et al. . |
| 5,511,907 | 4/1996 | Tabasco . |
| 5,520,483 | 5/1996 | Vigneri . |
| 5,525,008 | 6/1996 | Wilson ...................................... 405/128 |
| 5,584,605 | 12/1996 | Beard et al. . |
| 5,698,092 | 12/1997 | Chen .......................................... 210/94 |

OTHER PUBLICATIONS

Optimal Control for Deterministic and Uncertain Groundwater Remediation; Faculty of the Graduate School of Cornell University; Aug. 1995; by Gregory J. Whiffen.

*Primary Examiner*—Kevin J. Teska
*Assistant Examiner*—Hugh Jones
*Attorney, Agent, or Firm*—Schmeiser, Olsen & Watts

[57] ABSTRACT

A piecewise continuous-time dynamic control method and apparatus for optimizing remediation of groundwater is disclosed. The piece-wise continuous control process is used to generate efficient designs for rededication systems based on differentiable groundwater models. The remediation strategies generated are characterized by piece-wise continuous functions of time which dictate the operation of remediation devices. The piece-wise continuous functions may change discontinuity at the end of each management period, or optionally, a finite number of times during each management period. The duration and number of management periods covering a groundwater cleanup may be selected by the user of the invention to maximize the contamination removal efficiency and reflect the mechanical limitations of the specific rededication devices chosen. The continuous-time property of piece-wise continuous control requires simpler (usually sparse) derivatives of a groundwater model than the derivatives required by static and discrete-time control of groundwater remediation.

8 Claims, 10 Drawing Sheets

PIECEWISE CONTINUOUS CONTROL OF GROUNDWATER REMEDIATION

This application is a divisional of application Ser. No. 08/829,915, filed Mar. 28, 1997 now U.S. Pat. No. 5,813,798.

BACKGROUND OF THE INVENTION

1. Field of the Invention

The present invention relates to groundwater remediation. In particular, this invention relates to a method and apparatus for remediating a contaminated groundwater site using piecewise continuous control.

2. Background Art

Groundwater contamination has become a significant problem posing a threat to cleanliness of natural groundwater supplies. Heretofore, many methods and apparatus have been proposed to identify remediation (decontamination or stabilization) plans of groundwater supplies. These methods and apparatus can be quite complex. Given the complexity of the methods and apparatus to remediate groundwater supplies, computer model approaches have increased in importance in proposing best or "optimal" remediation plans. Each of these approaches for proposing optimal remediation plans, however, has certain disadvantages.

A. Heuristic Approaches:

Some computer model approaches use approximations or heuristics in proposing various remediation plans. These approaches include simulated annealing[1,2], genetic algorithms[3,4], and artificial neural networks[5]. Heuristic rules are used to eliminate plan alternatives, which in turn simplify the search for a remediation plan.

Heuristic approaches can address problems which have discontinuous controls and discontinuous objectives. A discontinuous control must have a value selected from a plurality of predetermined discrete values. In contrast, a continuous control may have any value selected from a continuous interval of values between an upper and lower limit. A discontinuous objective often results when discontinuous controls are considered. For example, if only five discrete sizes (discontinuous control) for a given remediation device are allowed and the objective is to minimize cost, then the result is five discrete "fixed costs" (discontinuous objective) wherein each fixed cost corresponds to each remediation device. The ability to solve problems with discontinuous objectives is important when considering an objective such as fixed costs.

A disadvantage of the heuristic approaches, however, is that they cannot guarantee that an optimal or best solution will be found, but only that a "good" solution is likely to be found. One of the eliminated designs could be the optimal design. The simulated annealing approach, for example, for groundwater remediation[1,2] is a heuristic, probablistic method for large scale combinatorial optimization problems. Simulated annealing involves a random search designed to find a good solution, and therefore, cannot guarantee an optimal solution. Moreover, it has been applied to groundwater management[1] in circumstances where there are only a few design alternatives to choose from. The genetic algorithm approach[3,4] for groundwater remediation is similar to the simulated annealing approach in that it is also a heuristic, probablistic method, and uses a random search. Again, an optimal solution is not guaranteed. The artificial neural network approach[5] constructs a neural network to approximate a groundwater model's response to different remediation designs. A genetic algorithm is then used with the neural network approximation to select a design. The advantage of this approach over the aforementioned genetic algorithm approach is that the computational effort of the groundwater model simulation is reduced. A serious disadvantage, however, is that the multiple levels of an approximation it requires render this approach highly imprecise. Moreover, all three heuristic approaches are computationally inefficient when extended to dynamic control problems.

Dynamic control problems allow the design to change over time. For example, the pumping rate of an extraction well may have to be changed over time to account for changes to the condition of the site. Under such circumstances, the three heuristic approaches typically require a geometric increase in computational time to solve such problems. Geometrically increasing effort severely limits the problem size which can be solved.

B. Linear Approaches and Nonlinear Gradient Approaches:

Several linear approaches have been proposed in the related art [7,20,21,22,23] for remediation design. Because the groundwater flow-contamination transport system response is non-linear, however, linear optimization approaches are not precise in representing the actual design problems involved in groundwater remediation processes. Accordingly, additional approximations resulting in imprecision are often required to account for the nonlinearity[7].

Nonlinear gradient approaches, on the other hand, are more precise than heuristic approaches. Mathematical theory guarantee optimal solutions are found for certain classes of problems. The only approximation required in nonlinear gradient approaches is approximation of the characteristics of an actual groundwater system when creating a groundwater model. A disadvantage of nonlinear gradient approaches, however, is that the objectives considered must be a continuous function of the design variables. Fixed cost is a discrete objective and thus is difficult, although not impossible, to accomplish[11,29] (see Appendix C.)

A nonlinear outer approximation type optimization procedure has been used and adapted to "pump and treat" remediation designs to approximate fixed costs[29]. This approach, however, has limited application in that it considers only a few potential well sites, and the computational work of this approach grows geometrically with each additional well location that is considered. This is a clear disadvantage because it is desirable to consider as many locations as possible to ensure a highly efficient method is found.

A nonlinear gradient approach proposed[14,26,27,28] in the related art is the nonlinear program package MINOS[12] which is used with the finite element model SUTRA[13]. The combination of these two preexisting computer programs results in an optimal groundwater design program. The approach finds a single, fixed rate (nondynamic) pumping strategy solution for "pump and treat" groundwater remediation systems. A disadvantage of this approach, however, is that it only provides a nondynamic solution. While the MINOS-SUTRA approach can be extended to solve problems which allow the pumping rates to change once during the cleanup[8], it is more problematic in solving problems which allow more than one pumping change (more control dynamics) due to MINOS requiring geometrically more effort with each additional dynamic degree of freedom involved in the analysis.

C. Dynamic Control Approaches:

Another type of nonlinear gradient approach is optimal control analysis. Optimal control analysis was specifically developed to solve dynamic problems efficiently. Optimal control analysis takes advantage of the law of cause and effect (a decision made in the future cannot affect the present) to solve optimal control problems efficiently.

The groundwater remediation approaches, as discussed above, do not allow the cleanup strategy to change over time. However, time-varying strategies can remove more of the contamination for less cost[8,9,10]. This is because during a cleanup, the spatial extent of the contaminated volume will change. What may have been the most efficient operation and location of the remediation devices in the beginning, may not be the most efficient later. Dynamic systems adapted to the movement and reduction of the contamination over time to maintain high efficiency throughout the remediation process. The savings in remediation operation costs using a dynamic system can be as large as 50%. Thus, if a remediation project is projected to cost several millions of dollars, then savings will also likely be on the order of millions of dollars.

To achieve these savings, the identification of optimal dynamic designs must be made computationally practical for large, three-dimensional problems. Optimal dynamic designs are more difficult to compute than nondynamic designs because there are more degrees of freedom involved. Several optimal dynamic approaches to groundwater remediation have been proposed in the related art. The MINOS-SUTRA method[8] already mentioned is a quasi-dynamic approach. Nevertheless, unlike other optimal dynamic approaches, the MINOS-SUTRA method does not take advantage of the temporal law of cause and effect for computational efficiency.

All other dynamic optimal control approaches for groundwater remediation are based on either the optimal method called discrete-time[15] differential dynamic programming (dDDP), or continuous-time[16] differential dynamic programming (cDDP). The first discrete-time methods, dDDP, to groundwater management[24] did not consider the cleanup of groundwater contamination. This approach was originally intended to be used only for managing water supply from an unconfined aquifer. In addition, the first dDDP method involving contamination used a one-dimensional finite difference groundwater model[17]. This approach, however, incorporated certain types of model parameter uncertainty. The approach was later extended to a small two-dimensional finite difference model for groundwater[18]. Applications of dDDP using a two-dimensional finite element groundwater model[19] and a two-dimensional bioremediation model[30] have been developed, but were simplified by using successive linear approximations with the groundwater model. These approximations are referred to as Sequential Approximation Linear Quadratic Regulator (SALQR). Even with these simplifications, however, these approaches are too computationally demanding for large, realistic groundwater models.

The dDDP-calculated optimal policies can also be modified with a nonlinear weighted feedback law as disclosed in U.S. Pat. No. 5,468,088 (which is hereby incorporated by reference) to maintain remediation efficiency even when there is an error in the groundwater model predictions. This feedback approach is limited, however, to problem sizes which can be solved using discrete-time dDDP approaches[9,10,19]. Another approach, called the (discrete-time) management period method[10], reduces the computational demand of applying dDDP (SALQR), but it achieves this by reducing the dynamic degrees of freedom that are available. This puts two important objectives at odds. Finding the most efficient remediation method for a particular site is often the most important objective. This objective is best accomplished by increasing the dynamic degrees of freedom that are available. This objective is at odds with the objective of reducing the computational effort to a practical level by decreasing the dynamic degrees of freedom available.

Another approach proposed to reduce the computational demand of dDDP is the Quasi-Newton approximation method[19], which reduces the computational effort by about 50%. This reduction is, however, not sufficient to enable the method to consider large realistic groundwater models.

Another dynamic optimal control approach, cDDP, as discussed above, is based on continuous-time optimal control, rather than discrete-time. Continuous-time methods treat time as a continuous variable. This is in contrast to discrete-time methods such as dDDP which treat time as a discrete variable. When dDDP is applied, a time step must be selected over which the remediation policy must remain fixed. The cDDP approach, on the other hand, assumes the remediation system can change continually over time, which leads to a maximally dynamic system design.

One advantage of cDDP over dDDP/SALQR is that the interface between cDDP and a given groundwater model is simpler than with dDDP/SALQR. This is because the continuous-time aspect of cDDP results in simpler derivative calculations. Simpler derivatives make changing the underlying groundwater model simpler. This is important because underlying groundwater models may need to be changed and updated frequently whenever technology or regulatory requirements change. Another advantage of cDDP is that even though the control may change continuously (maximally dynamic), the computational effort is not infinite. This is in contrast to dDDP/SALQR, which requires an infinite amount of computation for maximally dynamic problems. The cDDP method tracks control trends or rates of change rather than single control values. This difference manifests itself in cDDP's integration of ordinary differential equations, as opposed to dDDP/SALQR's step by step linear algebraic procedure. The main disadvantages of the cDDP method, however, is that it requires large amounts of computer memory and it is not always mechanically feasible or desirable to continuously adjust the remediation devices (such as pumping wells or nutrient injection systems) over time.

What is needed, therefore, is a dynamic groundwater remediation approach that achieves the best properties of both dDDP/SALQR and cDDP, while being more flexible and less computationally demanding than either one.

SUMMARY OF THE INVENTION

The present invention is a method and apparatus for decontaminating or stablizing a contaminated groundwater site using piecewise continuous control (i.e., monitoring and making appropriate changes in the cleanup of the site either continuously in time or at discrete times). The method steps of this invention include, determining contaminated groundwater site characterization information; generating a model of the contaminated groundwater site from the characterization information; designing a remediation system for the model using piecewise continuous control; and implementing the remediation system to decontaminate or stabilize the contaminated groundwater site.

The site characterization information includes types of contaminants (e.g., petroleum waste products, polychlorinated biphenyls (PCBs)) and location of the contaminants at the contaminated groundwater site. In addition, the site characterization information includes physical properties of the contaminated groundwater site including depth, topography, volume, materials, hydraulic conductivity, porosity, dispersivity, retardation, biological reactivity, hydraulic head, and recharge rates.

The present invention includes selecting and generating a model such as a finite element model, finite difference model, finite volume model, spectral method model, boundary element model, transform model, neural network model, or analytic model. Next, state variables such as hydraulic heads, nutrient concentrations, biomass and contamination concentrations; and system design variables such as location of remediation devices, operational rate of remediation devices, and inflow concentrations of nutrients or surfactants into remediation devices are implemented into the model. After state variables and system design variables are selected, design objectives such as minimizing cost, maximizing efficiency, minimizing risk, minimizing cleanup time, minimizing contamination level, minimizing number of cleanup devices, and minimizing flow rate from cleanup devices are selected. Next, design constraints (physical, biological, regulatory, and/or economic) such as pumping rate ranges for all extraction wells; pumping rate ranges for all injection wells; a hydraulic capture zone for stability of the contamination (stops it from spreading); a cleanup level (i.e. the cleanliness of the groundwater at the end of remediation); and a maximum water treatment plant size are specified. Once the objective function and constraints are selected, the constraints are incorporated into the objective function(s), parameters are initialized, and an initial arbitrary remediation system design is provided. Piecewise continuous control equations are integrated and a design update law is established. The updated designs are then simulated and tested for a satisfactory improvement in the objective function (e.g, the objective function approaching zero). The piecewise continuous control process using the improved designs is repeated if an optimal design is not determined.

The present invention is designed using devices such as extraction wells, injection wells, observation wells, slurry walls, infiltration caps, soil vapor extractors, air spargers, bioventors, and water treatment plants. One type of device may stimulate biodegradation of contamination in the contaminated groundwater site.

The present invention also includes an apparatus having a processing unit (e.g., central processing unit (CPU)), a memory system, and a program stored in the memory system for execution on the processing unit, the program including: a model of a contaminated groundwater site; and a piecewise continuous control optimization mechanism that optimizes remediation of the contaminated groundwater site over time.

The present invention in a different aspect includes a program product having a recordable media (e.g., Read Only Memory, Compact Disc), and a program recorded on the recordable media accessible by a computer system for execution on a central processing unit. The program includes a piecewise continuous control mechanism that optimizes remediation of a contaminated groundwater site over time.

The present invention has been tested using both a two-dimensional finite difference and a three-dimensional finite element model of groundwater flow and contamination transport. These tests demonstrate that the invention can identify optimal remediation designs given a user specified objective function and additional constraints. In addition, any twice continuously differentiable objective function can be used with the present invention. For example, if the objective function is selected to represent system cost, then the method will result in a low cost system. Moreover, the number or dynamic degrees of freedom is selected without regard to the computational effort required. This is possible because, in the present invention, unlike previous approaches, the computational effort is only weakly dependent on the user selected dynamic degrees of freedom available to the control. Unlike the related art management period method, which is a discrete-time method, the present invention is a continuous-time management period method.

The present invention provides a dynamic remediation approach that is highly cost efficient. This advantage satisfies a recognized existing need to reduce remediation costs. This will not only enable more contaminated sites to be detoxified, but the success rate for each is likely to be improved. Dynamic remediation systems have been shown to be more cost efficient than nondynamic systems[8,9,10]. The present invention also allows greater freedom in selecting the form of the dynamic policy than other time-varying methods in the related art.

The present invention provides a dynamic remediation design procedure which has the advantages of both the related approaches dDDP/SALQR and cDDP, without their respective disadvantages. Like cDDP and unlike dDDP/SALQR, the present invention has the advantage of treating time as a continuous process. Unlike cDDP, however, and like dDDP/SALQR, the present invention provides management periods. The present invention's management periods are also more flexible than dDDP/SALQR's management periods. Unlike dDDP/SALQR, the present invention allows continuous and discontinuous dynamic changes to the design during each management period. This advantage of the present invention gives the user greater flexibility to maximize efficiency and obey mechanical constraints. The present invention also requires less computational effort and memory usage than either cDDP or dDDP/SALQR. The present invention provides a continuous-time optimal design procedure which is simpler[25] to interface with groundwater models than discrete-time procedures. This aspect is useful because it is anticipated that groundwater models will continually improve the change over time. Also, regulatory requirements which specify what groundwater model(s) may be changed from time to time and from region to region. The ease of interfacing the present invention to new models is an advantage when new or different models are required. Further, it is easier[25] to exploit groundwater model sparsity with continuous-time control.

The present invention provides mechanically feasible designs and has the numerical advantages of a continuous-time optimal control method. The present invention provides an advantage over the related art continuous-time procedure cDDP because the design is characterized by piecewise continuous functions of time. For example, the design engineer has the freedom to require the optimal remediation device operation rates to be constant, or varied over simple functions period to satisfy mechanical constraints.

The present invention provides precise optimal solutions characteristic of nonlinear gradient methods. This is an advantage over all heuristic and probabilistic methods in the related art because these methods do not guarantee optimal designs. Also, the present invention has the advantage over linear optimization methods because it is a fully nonlinear method. Non-linear methods directly incorporate the non-linearity inherent in groundwater contamination system response.

The present invention provides a design procedure for dynamic remediation systems which is much less computationally demanding than related art approaches. Also, the present invention provides a remediation design approach which incorporates fully three dimensional groundwater flow and transport models. Most related art approaches are two dimensional.

The present invention allows more freedom in specifying the objective (or objective function) than related art optimal control approaches. This added freedom insures that the most appropriate objective can be specified for each specific remediation project.

The present invention provides a design procedure with a high degree of flexibility of allowing design variable dynamics. The flexibility of design dynamics (management periods) allows both mechanical constraints and optimum cleanup efficiency to be realized. The present invention is also less computationally sensitive to the design dynamics than the related art. The computational effort associated with increasing the dynamic freedom of the design is less than that associated with any related art method.

The present invention provides dynamic or time-changing remediation systems which have been shown to be more cost efficient than nondynamic systems[8,9,10].

The present invention does not require that the dynamic freedom be selected to make the computation feasible on a computer as can be the case with all other methods in the related art. Another advantage of the present invention is that it provides a continuous-time (as opposed to discrete or static) optimization process which is easily interfaced with improved groundwater models when they become available. It provides a continuous-time optimization process which can take advantage of adaptive precision ODE integrators and sparsity to maximize computational efficiency.

Another advantage of the present invention is that it provides a precise nonlinear gradient method which does not yield "trickle" or low flow rate devices or wells in the optimal design because the poor cost efficiency of trickle devices can be correctly represented (Appendix C).

Further advantages of the present invention will become apparent from a consideration of the following drawings and detailed description.

DETAILED DESCRIPTION

Overview

Figure 1:
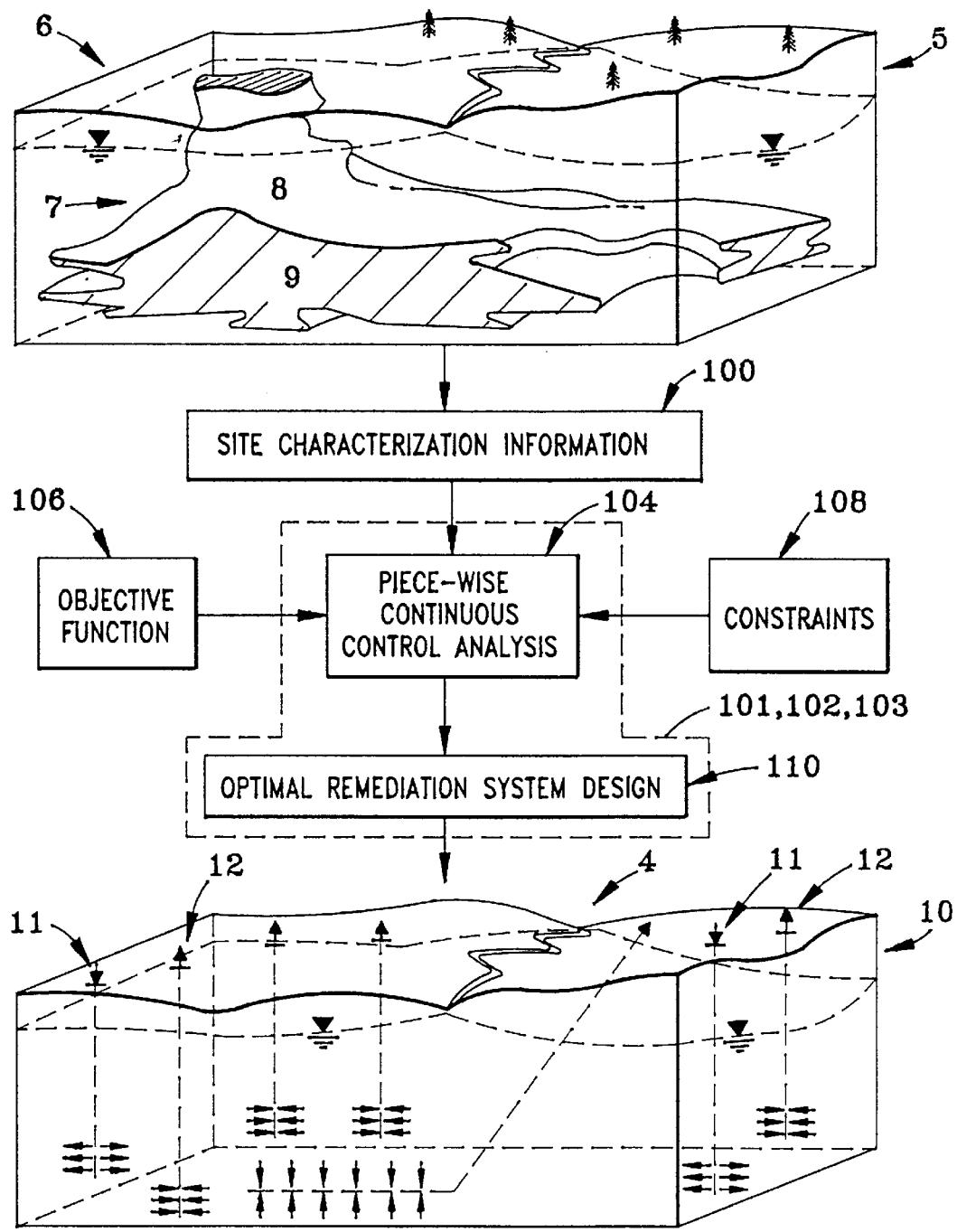
FIG. 1 is a flow chart illustrating piecewise continuous control of groundwater remediation of a preferred embodiment of the present invention.

Optimization goals or objectives will vary from one site to another. For example, the cost of groundwater remediation is often a major factor in the decision to implement any particular remediation plan. The cost of remediating a single contaminated site using conventional technologies can exceed several billion dollars[31]. Computer models for simulating and comparing the effectiveness of different remediation plans are necessary give the many design variables and site conditions which exist.

First, information on the site conditions must be established. This information or "characterization" such as type of contaminant, location of contaminant and physical properties of the site is used in computer modeling. Physical properties of the groundwater site include depth, topography, volume, materials, hydraulic conductivity, porosity, dispersivity, retardation, biological reactivity, hydraulic head, and recharge rates.

Next, design variables must be selected. Design variables include cleanup devices such as extraction wells, injection wells (for water, nutrients, and surfactants), observation wells, slurry walls, infiltration caps, soil vapor extractors, air spargers, bioventors, and water treatment plants. Selection of the appropriate device or devices for remediation can make a difference between a successful cleanup effort and an unsuccessful one. Certain devices will be more effective than others in dealing with certain types of problems depending on the properties of the contaminated site.

The rate at which the devices are to be operated can vary substantially. The appropriate operational rate for any particular type of device will depend on several factors. These include the amount and location of contaminants found at the site, the cost of running and maintaining the devices, and the amount of time needed to complete the cleanup, etc. The operational rate for any given type of device may also be constrained by the physical properties of the site.

Once a decision is made to use any particular device or devices, it is often desirable to minimize installation cost, operating cost and maintenance cost. Further, it is desirable to know that optimum number of devices, optimum location of the devices, and the optimum operational rates.

The number of remediation plans available for a given site is very large or infinite. Any particular remediation plan, for example, may involve dozens or more of the extraction wells, positioned at predetermined locations throughout the site. Further, consider, for example, that the selection of an intake location for a single extraction well can be specified by a three-dimensional coordinate, the value of which can vary almost infinitely. The difficulty of locating a single well and/or device at the most effective location is then compounded not only by the total number of wells and/or devices that most be positioned, but also by the varied site conditions and objectives that are being considered.

Developing and implementing a remediation plan can be made even more difficult when considering the time changing (dynamic) character of any given site. The dynamic character can have significant impact on the long term success and/or cost of the cleanup. For example, over time, the groundwater conditions can be significantly affected and changed by the operation of the devices. As a result, the location of the densest areas of contamination within the groundwater site will change. Underground flow patterns can also change over time. For these reasons, implementation of a successful remediation plan preferably involves making adjustments during the course of the cleanup to take into consideration the dynamic changes to the condition of the site.

The large number of possible remediation plans available makes optimizing more difficult but also more desirable. The likelihood that highly nonobvious, highly efficient solutions will be achieved increases with the complexity of the problem considered.

Preferred Embodiment(s)

With reference to the drawings, FIG. 1 shows a flow diagram 10. A sample contaminated groundwater site 5 and its initial contaminated condition is shown. Contaminated groundwater site 5 includes earth surface 6, an aquifer with the groundwater 7, contamination 9, and contamination surface 8.

After identifying a contaminated groundwater site 5, site characterization information 100 is determined. Site characterization information 100 includes type of contaminant, location of contaminant 9, and physical properties. Hydrogeo-chemical measurements are taken of the site 5 to determine the physical properties such as depth, topography, volume, materials, hydraulic conductivity, porosity, dispersivity, retardation, biological reactivity, hydraulic head, and recharge rates.

With the characterization information 100, a model using piecewise continuous control 104 of the contaminated groundwater site 5 is created. Modeling the groundwater site 5 involves the use of a computer with a central processing unit 101 having a memory 102 or recordable media 103. Design objectives 106 and constraints 108 are then specified and input into the model 104. For example, the design objectives 106 may be the cost as a function of the design variables. The goal is then to minimize the cost over all possible designs. A design constraints 108 may require that the site be remediated within ten years. Another design constraint 108 may require no contamination concentration exceeding a given value be allowed outside a given compliance boundary during the remediation. In general, design constraints 108 may be physical, biological, regulatory, and/or economic in nature. Virtually any type of constraint, associated with the particular contaminated site, that will have an impact on the remediation plan, can be specified using the present invention.

Figure 10:
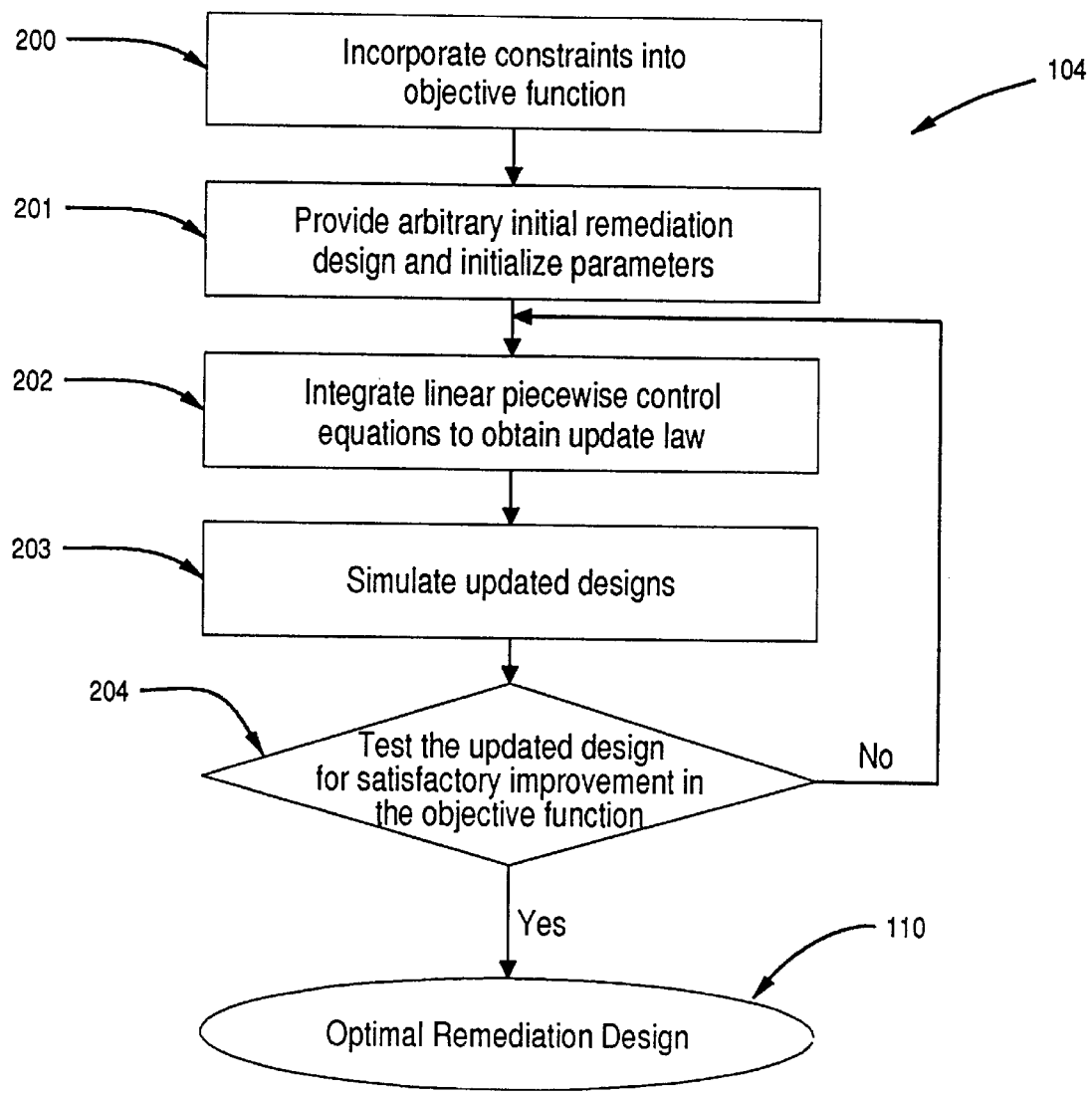
FIG. 10 is a flow chart illustrating piecewise continuous control of groundwater remediation.

With reference to FIG. 10, once the objective function 106 and constraints 108 are selected, the constraints 108 are incorporated into the objective function(s) 200, parameters are initialized and an initial arbitrary remediation system design is provided 201. Piecewise continuous control equations are integrated 202 to obtain a design update law. The updated designs are then simulated 203 and tested for a satisfactory improvement in the objective function (e.g., the objective function approaching zero) 204. The piecewise continuous control process using the improved designs is repeated if an optimal design is not determined. After, an optimal design 110 is determined, it is implemented to remediate the groundwater site.

FIG. 1 shows a hypothetical implemented optimal remediation system 200 involving injection wells 11 and extraction wells 12. The implementation can involve not only installing, setting up, operating and maintaining the devices, but also monitoring the progress of the cleanup, and making any changes, either at continuous time intervals or at discrete time intervals, using the remediation plan as a guideline. To better understand the details of the present invention, a description of the piecewise continuous control process, linked to a general sample model of a contaminated groundwater site, is provided below.

A specific description of actual tests performed involving piecewise continuous control linked to two specific groundwater models is hereinafter provided. The first model is a two-dimensional (third or vertical dimension averaged) finite difference model of flow and contamination transport[25]. This particular model has been used in the past with the dDDP/SALQR and cDDP methods. A comparison of the relative performance of the present invention and the related art methods will show the superiority of the present invention. The second test demonstrates the effectiveness of the present invention when coupled with a fully three-dimensional finite element model of the groundwater site. The description of the present invention will begin in conjunction with an application of the piecewise continuous control process to a sample, contaminated groundwater site. It should be understood, however, that the present invention can be applied to virtually any contaminated site, which can differ substantially from the two shown. While the sample model may require certain variables, objectives and constraints, to be considered, other models may require other variables, objectives, and constraints, in addition to, and/or in place of, those that are discussed. Accordingly, while the sample model represents what a typical application may involve, it is not in any way intended to represent a limitation on the manner in which the present invention can be applied.

A. Site Characterization:

A site characterization involves field measurements and inferences to determine groundwater site properties. Aquifer properties include hydraulic conductivity, porosity, groundwater site extent, specific storage, dispersivity, retardation or absorptivity, contamination type, contamination extent, biological reactivity, hydraulic head or flow patterns, and recharge rates.

Once a site characterization has been performed, a numerical model of the groundwater- contamination system can be constructed. Many different models are available and presently used for this purpose. Models can predict the response of the contaminated region of different remediation system designs. The present invention can be used with any differentiable groundwater flow and contaminant transport model. Differentiable models include, but are not limited to, finite difference, finite element, finite volume, transform, analytic, boundary element, and spectral method models. An application involving a finite difference model and a finite element model will be given in the next section. Groundwater flow and transport models solve partial differential equations which describe the physics and chemistry of the groundwater system. For two examples of partial differential equation systems, see (22)–(24) and (33)–(36). The solution of the equations results in a groundwater model of the form:

$$\left\{ \begin{array}{l} \text{Future water flow pattern} \\ \text{and contamination location} \end{array} \right\} = \qquad (1)$$

$$\text{function} \left\{ \begin{array}{l} \text{Current water flow pattern,} \\ \text{contamination location, and} \\ \text{remediation strategy} \end{array} \right\}.$$

Other properties which a model may compute include, but are not limited to, biomass and oxygen levels for bioremediation.

In order to apply piece-wise continuous control, the following definitions are needed: let the vector x(t) represent all the "state" variables at time t required by the model in order to make a prediction of the future. State variables include all time changing physical properties required by the groundwater model. For an ordinary groundwater flow and transport model, the state variables are the hydraulic heads and contamination concentrations at each node on the model mesh. Let the vector v(t) represent the remediation system "design" variables required by the model to predict the future state of the of the groundwater. For example, design variables may include the location and operational rate of remediation devices, or the inflow concentrations of oxygen or surfactant at injection wells. With these definitions, we can write equation (1) as follows:

$$x(t+\Delta t) = \text{function}\{x(t), v(t), t\} \qquad (2)$$

where $\Delta t$ is a positive number. All fixed physical parameters required by the groundwater model (for example hydraulic conductivity) are implicit to the "function" in (2).

Most groundwater models are of the form of equation (2). The first step in adapting a groundwater model to be used with piece-wise continuous control is to obtain the time rate of change of the state, x(t), as a function of the state variables and design variables, v(t). Define the function "T" to be the time rate of change of the state:

$$T\{x(t), v(t), t\} \triangleq \frac{dx(t)}{dt}. \qquad (3)$$

The derivative $$\frac{dx(t)}{dt}$$

is the time rate of change each state variable is undergoing as a result of the current physical state of the contaminated groundwater site and remediation system design. The computation of equation (3) is almost always already present as an intermediate step in groundwater models.

B. Specifying Objective and Constraints

Once the function "T" in equation (3) is determined, then piece-wise continuous control can be applied as follows:

First, specify the design objective. The objective must be given as a function, J, of the state variable x and the design variables v in the following form:

$$J = \int_{t_0}^{t_N} F(x(\tau), v(\tau), \tau) d\tau + \sum_{i=1}^{N} G(x(t_i), v(t_i), t_i). \qquad (4)$$

The time over which the remediation is scheduled to take place is divided into a finite number N subintervals ($t_0$ to $t_1$), ($T_1$ to $t_2$), ..., ($t_{N-1}$ to $t_N$). The subintervals are selected by the user of the invention and may have the same or varying lengths. The design can, although not necessarily so, be restricted to change in a limited way during each subinterval to accommodate mechanical constraints. For example, suppose the subintervals are chosen to be 3 months long and a static design is desired. The optimal design will be required to remain fixed for three months before the system design is allowed to change. The freedom to specify periods during which the design is constant or varies in a limited way ensures the optimal design is mechanically practical. The only related art continuous-time approach cDDP does not have this freedom.

The functions F and G can be any twice continuously differentiable functions of x and v as long as the design problem is well posed. The user of the invention can select an objective function which best describes the design objectives for the remediation system. Piece-wise continuous control will find a design which minimizes the objective function (4).

Often, the objective function is chosen to approximate the cost of the remediation system. When this is the case, piece-wise continuous control can find a least cost remediation design. Also, when the objective J approximates the cost, functions F and G can appropriately be interpreted in terms of cost. The function $F(x(\tau), v(\tau), \tau)$ is the cost per time for operating the remediation system design $v(\tau)$, given that the then current state of the groundwater site is $x(\tau)$. The function $G(x(t_i), v(t_i), t_i)$ is the one-time cost or "end cost" for the state of the system being $x(t_i)$ and using a remediation system corresponding to $v(t_i)$. Note that the set of possible objectives for the present invention (4) is a superset of the possible objectives for dDDP/SALQR and the possible objectives for cDDP. This is an advantage over both related art methods.

The user of the invention may also specify twice-continuously differentiable constraints of the form:

$$L(x(t), v(t), t) \leq 0 \text{ for t in a given interval} \qquad (5)$$

The constraints can be, for example, that the pumping rate must be zero or positive for all extraction wells, as shown by: $-v(t) \leq 0$, and the pumping rate must be zero or negative for all injection wells, as shown by: $v(t) \leq 0$. A stabilization constraint (stop contamination from spreading) usually involves specifying the hydraulic gradient $\Delta h$ around a capture zone. Often, one constraint will be the "clean-up constraint," which requires the groundwater to be clean at the end of the remediation. The clean-up constraint may be of the form:

$$c(t_N) - \text{safe standard} \leq 0 \qquad (6)$$

where $c(t_N)$ is the contamination concentration (a state variable) at each node at the end of the remediation. The parameter "safe standard" is the maximum safe contamination concentration.

C. Piece-Wise Continuous Control

Once an objective and constraints, if any, are selected, the remediation system design can be obtained by applying the following steps using the design problem parameters below.

N=Number of discontinuous control changes allowed
n=Dimension of the state vector x(t)
m=Dimension of the control vectors $u_i$ (i=0,1, ..., N)
m'=Dimension of the design vector v(t)
$t_i$=(i=0,1, ..., N) Times markings discontinuous control changes Find the design such that the object $$J^* = \min_u J = \min_u \int_{t_0}^{t_N} F(x(\tau), v(\tau), \tau) d\tau + \sum_{i=1}^{N} G(x(t_i), v(t_i), t_i), \qquad (7)$$

is minimized, subject to the continuous time transition function representation of the ground-water model:

$$\frac{dx(t)}{dt} = T(x(t), v(t), t), \quad x(t = t_0) = \tau_{initial}, \qquad (8)$$

and constraints of the form:

$$L(x(t),v(t),t) \leq 0. \qquad (9)$$

The design vector, v(t), is constrained to be a parametric function of time over each of N specified time intervals called "management periods."

$$v(t) = \begin{vmatrix} f_1(u_1, t) & \text{for } t = t_0 \text{ to } t_1 \\ f_2(u_2, t) & \text{for } t = t_1 \text{ to } t_2 \\ \vdots & \vdots \\ f_N(u_N, t) & \text{for } t = t_{N-1} \text{ to } t_N. \end{vmatrix} \qquad (10)$$

The design vector v(t) is a piece-wise continuous vector function of time defining the remediation design variable values at each time instant. The values of the design variables may change discontinuously at management period interfaces $t_1, t_2, t_3, \ldots, t_{N-1}$. If desired, the design may also change discontinuously a finite number of times during each management period (see Appendix D). The functions $f_i(u_i,t)$, $i=1,2,\ldots,N$ are parameterized by $u_i \in \Re^m$. We define the control vector for the $i^{th}$ management period to be the set of parameters $u_i$. The time intervals $(t_{i-1}, t_i)$, $i=1,2,\ldots,N$ and the number of periods N may be chosen arbitrarily.

In the simplest case, the design is required to be constant in time during each management period. In this case, the design vector v(t) will be equal to the $i^{th}$ control vector $u_i$ during the $i^{th}$ management period:

$$v(t) = \begin{vmatrix} u_1 & \text{for } t = t_0 \text{ to } t_1 \\ u_2 & \text{for } t = t_1 \text{ to } t_2 \\ \vdots & \vdots \\ u_N & \text{for } t = t_{N-1} \text{ to } t_N. \end{vmatrix} \qquad (11)$$

Figure 8:
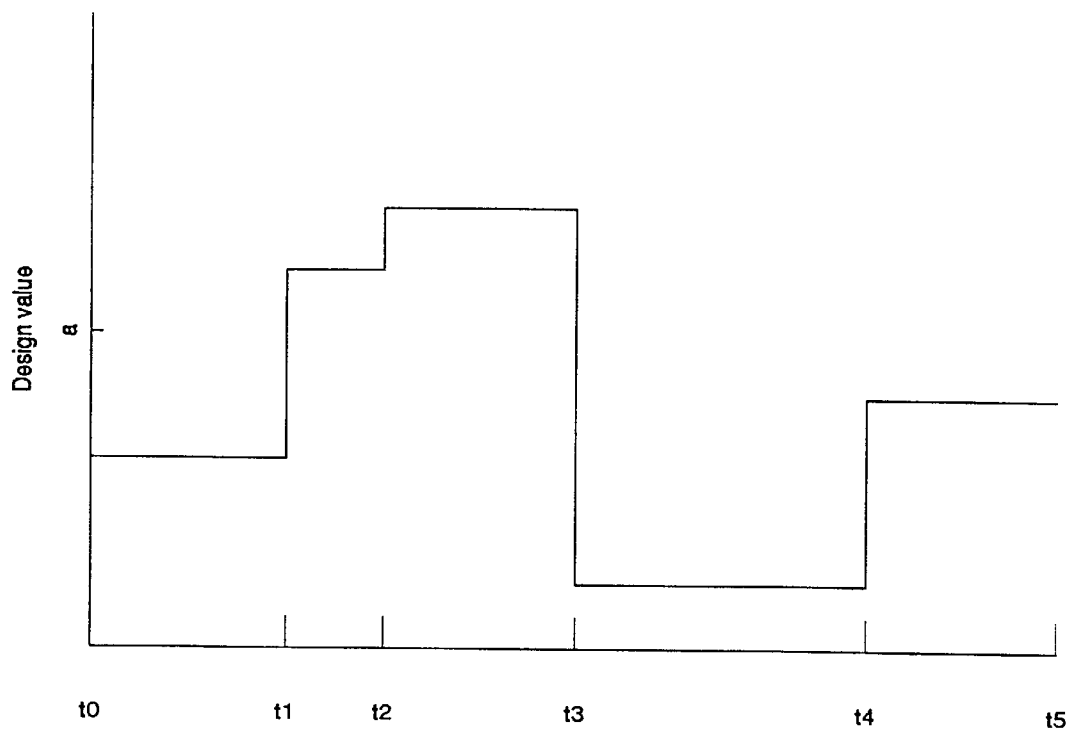
FIG. 8 depicts an example of a static management period design for a preferred embodiment of the present invention.
Figure 9A:
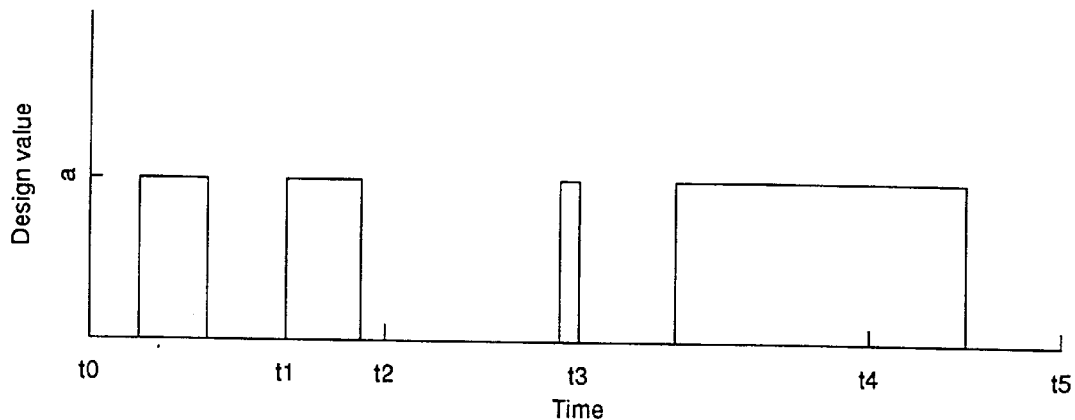
FIGS. 9 a, 9b and 9c are examples of some of the possible design dynamics available for the design using a preferred embodiment of the present invention.
Figure 9B:
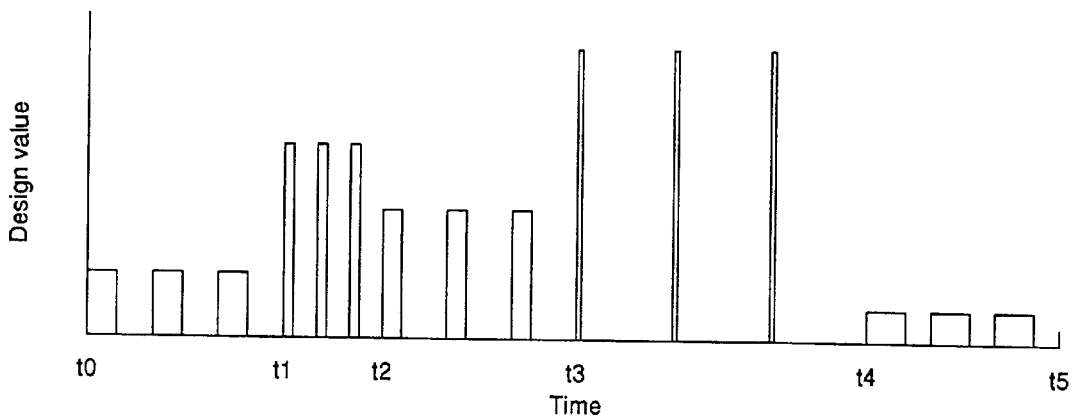
Figure 9C:
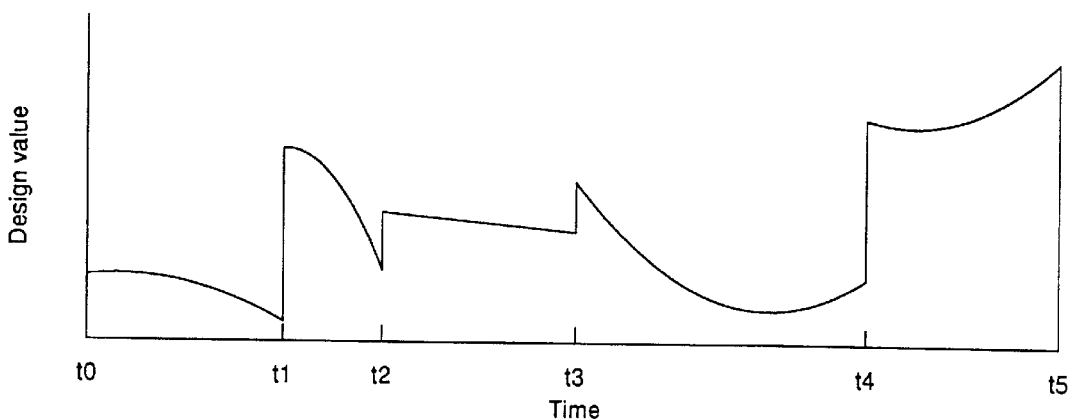

This and several other design forms are plotted in FIGS. 8, 9a, 9b and 9c. See Appendix D. FIG. 8 shows an example of a static management period design, wherein the design within any particular management period is static. FIG. 9a is an example of a single rate, on/off, device that is turned on and/or off within the management periods at a constant rate. FIG. 9b is an example of a pulsed operation of a multi-rate device, wherein the device is turned on and/or off within the management periods at varying constant rates. FIG. 9c is an example of a design allowing continuous quadratic changes in time during each management period. Many other design forms are possible.

The state vector $x(t) \in \Re^n$ is a continuous function of time. It is assumed that F, G, T, and L are twice continuously differentiable with respect to state x and control u.

Step 0: Incorporated the constraints (9) into the objective function using a twice differentiable penalty function. An example of this step is given in the next section.

Step 1: Provide an initial (arbitrary) guess for each control vector $u_i$, $i=1,2,\ldots,N$. Calculate the corresponding time evolution of the system state x(t) using the transition equation (8). Denote this control-state pair as $\bar{u}$ and $\bar{x}$. Calculate the objective value using (7). Denote the objective value $J(\bar{u})$.

Step 2: Set the parameters $P=0^{n \times n}$, $Q=0^{n \times 1}$, and $\Delta R=0$.

Step 3: For $i=N, N-1, N-2, \ldots, 1$ integrate the system of linear, coupled ordinary differential equations:

$$\dot{J}_x = -F_x - T_x^\dagger J_x \qquad (12)$$

$$\dot{J}_u = -F_u - T_u^\dagger J_x \qquad (13)$$

$$\dot{J}_{xx} = -F_{xx} - J_{xx} T_x - T_x^\dagger J_{xx} - J_x T_{xx} \qquad (14)$$

$$\dot{J}_{xu} = -F_{xu} - J_{xx} T_u - T_x^\dagger J_{xu} - J_x T_{xu} \qquad (15)$$

$$\dot{J}_{uu} = -F_{uu} - J_{xu}^\dagger T_u - T_u^\dagger J_{xu} - J_x T_{uu}, \qquad (16)$$

backward in time from $t=t_i$ to $t=t_{i-1}$, subject to the terminal conditions:

$$J_x(t_i) = G_x(x(t_i), f_i(u_i, t_i), t_i) + Q$$

$$J_u(t_i) = G_u(x(t_i), f_i(u_i, t_i), t_i)$$

$$J_{xx}(t_i) = G_{xx}(x(t_i), f_i(u_i, t_i), t_i) + P$$

$$J_{xu}(t_i) = G_{xu}(x(t_i), f_i(u_i, t_i), t_i)$$

$$J_{uu}(t_i) = G_{uu}(x(t_i), f_i(u_i, t_i), t_i),$$

where $J_x(t) \in \Re^n$, $J_u(t) \in \Re^m$, $J_{xx}(t) \in \Re^{n \times n}$, $J_{xu}(t) \in \Re^{n \times m}$, and $J_{uu}(t) \in \Re^{m \times m}$. The subscripts x and u denote partial differentiation with respect to state and control. The superscript † indicates the transpose operation.

Use the results of the integration to evaluate and store:

$$\gamma_i = -J_{uu}^{-1}(t_{i-1}) J_u(t_{i-1}).$$

Replace the value of $\Delta R$ with:

$$\Delta R = \Delta R + J_u^\dagger(t_{i-1}) J_{uu}^{-1}(t_{i-1}) J_u(t_{i-1}).$$

If $i \geq 2$ then calculate and store:

$$\eta_i = -J_{uu}^{-1}(t_{i-1}) J_{xu}^\dagger(t_{i-1}),$$

and replace the current values of P and Q with:

$$P = J_{xx}(t_{i-1}) - J_{xu}(t_{i-1}) J_{uu}^{-1}(t_{i-1}) J_{xu}^\dagger(t_{i-1}) \qquad (17)$$

$$Q = J_x^\dagger(t_{i-1}) - J_u^\dagger(t_{i-1}) J_{uu}^{-1}(t_{i-1}) J_{xu}^\dagger(t_{i-1}). \qquad (18)$$

Let $i=i-1$ and repeat Step 3 if $i>0$.

Step 4: For $j=1, 2, \ldots, N$, calculate the updated policy and the corresponding state trajectory for each time period in forward time order. Calculate:

$$u_j = \bar{u}_j + \eta_j(x(t_{j-1}) - \bar{x}(t_{j-1})) + \epsilon \gamma_j \qquad (19)$$

where $\epsilon$ is a line search parameter $\epsilon$ (0,1]. (Note for $j=1$ the term involving $\eta$ need not be included). Use $u_j$ to integrate:

$$\frac{dx(t)}{dt} = T(x(t), f_j(u_j, t), t) \qquad (20)$$

from $t=t_{j-1}$ to $t=t_j$ starting with $x(t_0)=x_{initial}$ for $j=1$. If $j<N$, then let $j=j+1$ and repeat Step 4. Concurrently with Step 4, evaluate the objective function (4) using the updated control. Denote the objective value $J(u)$.

Step 5: Compare the objective value $J(u)$ with the objective value $J(\bar{u})$ obtained from using the nominal policy $\bar{u}$ (t). If there is satisfactory reduction, replace $\bar{u}$ (t) and $\bar{x}$ (t) by u(t) and x(t) and go to Step 2, else reduce $\epsilon$ and repeat Step 4. A satisfactory reduction criteria that can be used is:

$$J(\bar{u}) - J(u) \geq \frac{1}{2}\left(\frac{\epsilon^2}{2} - \epsilon\right)\Delta R \qquad (21)$$

This criteria is simply a requirement that the observed reduction in the objective be at least half the reduction we expect if the problem were exactly quadratic (see Appendix B.)

The following are some additional comments on the piece-wise continuous control process. The system of ordinary differential equations (12)–(16) are linear. The corresponding system of ODEs for cDDP and pointwise Newton methods, however, are nonlinear. Linearity of the ODE system makes implicit time stepping possible with the solution of a linear system of equations, whereas nonlinear ODEs require the solution of a nonlinear system of equations. Using linear ODEs is a considerable advantage over the related art so long as the system being optimized is stiff in nature, as groundwater remediation optimal control problems are in general stiff[25].

Unlike dDDP/SALQR, the present invention allows dynamic changes to the design $f(u,t)$ during each management period. This property of the present invention gives the user great flexibility to maximize efficiency and obey mechanical constraints. When explicit time-stepping is used with the present invention, it is recommended that time step acceleration or super-time-stepping[33] be used to reduce the number of time steps required for numerical stability.

The present invention requires first and second derivatives of F, G, and T. Using dDDP, neglecting second derivatives of it's analogue of T (SALQR) was demonstrated to outperform full second order dDDP under some circumstances[9]. The present invention can also be implemented setting the second derivatives of T to zero. This would amount to dropping the terms $J_x T_{xx}$, $J_x T_{xu}$, and $J_x T_{uu}$, which appear in (14), (15), and (16) respectively. It is also possible to use quasi-Newton approximations for the second derivatives of T analogous to those suggested[19,35] for dDDP. We can also relax the requirement that $J_{uu}(t_i)$, i=1, . . . ,N be positive and definite by implementing a Hessian shifting analogous to those outlined[36] for dDDP. The same global convergence properties for the modified dDDP method will apply to the present invention.

D. Two-Dimensional Finite Difference Model

Piece-wise continuous control has been applied to a two-dimensional, third (or vertical) dimension averaged, finite difference model of groundwater flow and transport. The same model has also been used with two related art methods. A comparison of the relative performance of the present invention and the related art is given which demonstrates the benefits of the present invention.

The two-dimensional finite difference model solves the following partial differential equations which describe confined two-dimensional groundwater flow and contamination transport (see Table 1 for notation):

$$\nabla \cdot (T_a \nabla \bar{h}) + \sum_{i \in Q} \bar{q}_i \delta(\hat{x}_i, \hat{y}_i) - bS_a \frac{\partial \bar{h}}{\partial t} = 0. \qquad (22)$$

Adsorption kinetics are assumed to be linear $$\frac{\partial S}{\partial c} = k_0.$$

The transport equation is:

$$\nabla \cdot (\theta b \bar{D} \cdot \nabla c) - b\bar{v} \cdot \nabla c - b\left(\theta + \rho_B \frac{\partial S}{\partial c}\right)\frac{\partial c}{\partial t} = 0. \qquad (23)$$

The dispersivity tensor $\bar{D}$ is assumed to have velocity dependent components:

$$\bar{D}_{xx} = \frac{\alpha_L \bar{v}_x^2 + \alpha_T \bar{v}_y^2}{|\bar{v}|} \qquad (24)$$

$$\bar{D}_{xy} = \frac{\bar{v}_x \bar{v}_y (\alpha_T - \alpha_T)}{|\bar{v}|}$$

$$\bar{D}_{yy} = \frac{\alpha_T \bar{v}_x^2 + \alpha_L \bar{v}_y^2}{|\bar{v}|}$$

TABLE 1

2D Flow and transport model variables

| | |
|---|---|
| $\alpha_T$ | Transverse dispersivity (L) |
| $\alpha_L$ | Longitudinal dispersivity (L) |
| b | saturated vertical thickness of the groundwater site (L) |
| c | Dissolved contaminant concentration (M/L$^3$) |
| $\bar{D}$ | vertically averaged hydrodynamic dispersion tensor (L$^2$/T) |
| $\delta(\hat{x}_i, \hat{y}_i)$ | two dimensional Dirac delta function centered at ($\hat{x}_i, \hat{y}_i$) |
| ($\hat{x}_i, \hat{y}_i$) | Coordinates (location) of well i |
| $q_i$ | pumping rate for well i located at ($\hat{x}_i, \hat{y}_i$) (L$^3$/T) |
| $\bar{h}$ | vertically averaged hydraulic head (L) |
| $k_0$ | equilibrium constant for linear isotherm (L$^3$/M) |
| $T_\alpha$ | groundwater site transmissivity tensor (L$^2$/T) |
| $\rho_B$ | bulk density of the porous media (M/L$^3$) |
| S | mass of adsorbed pollutant per unit mass of porous medium |
| $S_s$ | specific storage (L$^{-1}$) |
| $\theta$ | porosity |
| $\bar{v}$ | vertically averaged Darcy velocity defined as $\bar{v} = -T_a \cdot \nabla \bar{h}/b$ (L/T). |

A centered (second order accurate) finite difference method was employed to solve the governing equations (22)–(24). The same discretization length was used in both dimensions. The time domain was alternately discretized using an implicit Euler, an explicit Euler, and a super-time-stepping[33] method for comparison.

Figure 2:
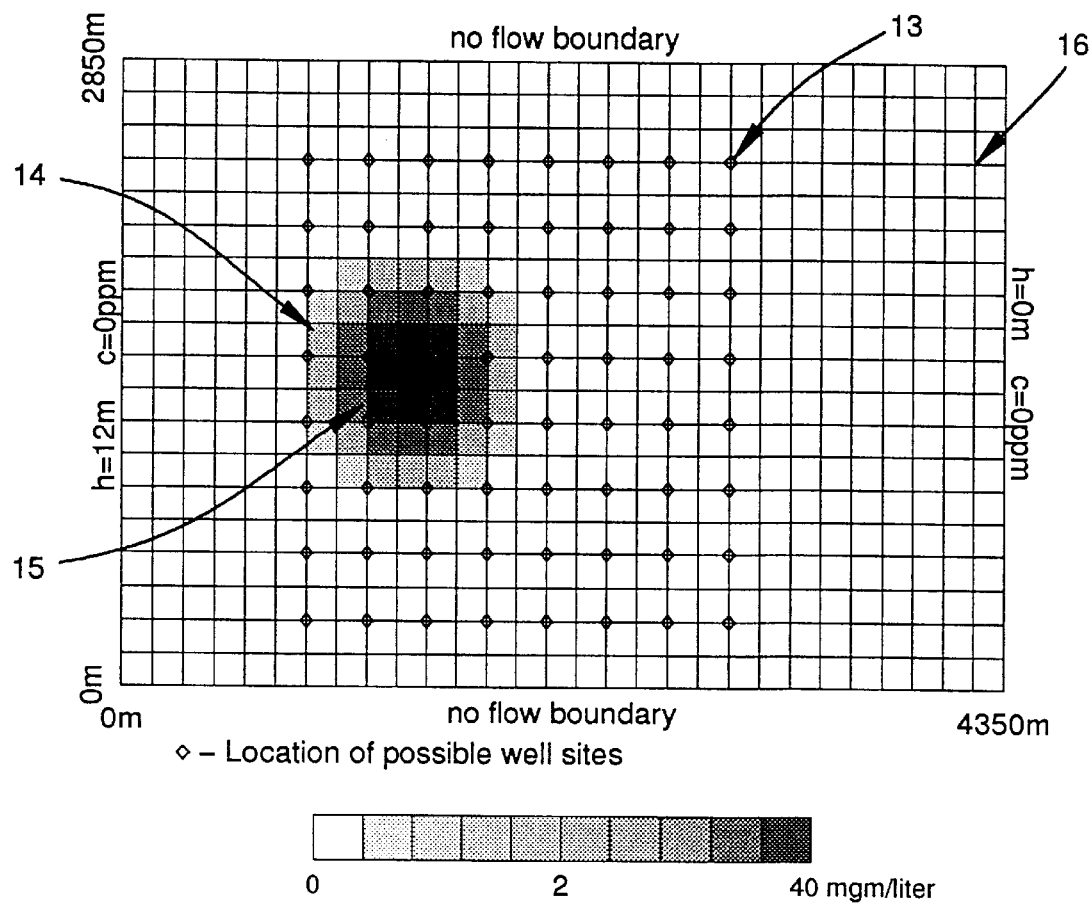
FIG. 2 is a plan view of the initial contamination distribution, boundary conditions and computational mesh, with the initial contamination (gray scale), for the two-dimensional 600 node example of a preferred embodiment of the present invention.

Piece-wise continuous control was applied to the following remediation problem: Given the initial contamination of groundwater, as indicated by FIG. 2, a system design is needed to remove the contamination until the concentration is everywhere less than 0.5 milligrams per liter. Furthermore, the system design of the remediation system must be such that the square of the pumping rate is at a minimum (to ensure high efficiency). For this example, we will restrict the design to be a "pump and treat" system. "Pump and treat" systems decontaminate groundwater by extracting the contaminated water with extraction wells and decontaminating the withdrawn water above ground.

The state variables for this example are the hydraulic heads $\bar{h}$ and the dissolved contamination concentrations c at each Non-Dirichlet node on the computational mesh. Of the 600 nodes 16, which are indicated by the crossing of vertical and horizontal lines in FIG. 2, the nodes selected as possible well locations are indicated by diamonds 13. The grey shaded area 14 represents the contamination. The darkest area 15 represents where the contamination is most dense.

The design variables are the pumping rates for extraction wells. The number of possible well locations in the example given in FIG. 2 is 64. Well locations with non-negligible optimal pumping rates are interpreted as the optimal well locations. Pumping rates (and hence well locations) are required to be fixed for the duration of each management period. This ensures the design is practical. In this example, the design variables will be equal to the current management period control parameters—see (11).

The design variables correspond to extraction rates so we require $v(t) \geq 0$ (or equivalently $u_i \geq 0$ i=1,2, . . . ,N). A clean-up constraint of 0.5 milligrams per liter maximum concentration will be required at all model nodes at the end of the remediation $t_N$. Design problem formulation Find the design v(t) which minimizes $$J^* = \min_v J = \min_v \int_{t_0}^{t_N} v(\tau)^t v(\tau) d\tau \quad (25)$$

subject to the prediction of the groundwater flow and transport model, $$\frac{d x(t)}{d t} = T(x(t), v(t), t) \quad x(t = t_0) = x_{initials}, \quad (26)$$

and constraints:

$$v(t) \geq 0 \quad \epsilon(t_0, t_N) \quad (27)$$

$$c(t_N) \leq 0.5 \text{ mgm per liter.} \quad (28)$$

The function $c(x(t_N))$ returns the contamination concentration at the end of the remediation. The design is required to be fixed during each management period (i.e. $f_i(u_i, t) = u_i$):

$$v(t) = \begin{vmatrix} u_1 & \text{for } t = t_0 \text{ to } t_1 \\ u_2 & \text{for } t = t_1 \text{ to } t_2 \\ \vdots & \vdots \\ u_N & \text{for } t = t_{N-1} \text{ to } t_N. \end{vmatrix} \quad (29)$$

The constraints (27)–(28) were incorporated into the objective using two penalty functions $\Psi_1$ and $\Psi_2$:

$$J^* = \min_v J = \min_v \int_{t_0}^{t_N} [v(\tau)^t v(\tau) + \Psi_1(v(\tau))] d\tau + \Psi_2(x(t_N)) \quad (31)$$

The penalty functions are defined as follows:

$$\Psi_1(v(t)) \triangleq \begin{cases} -s_1 v(t)^3 & \text{if } v(t) < 0 \\ 0 & \text{if } v(t) \geq 0. \end{cases} \quad (31)$$

$$\Psi_2(x(t_N)) \triangleq \begin{cases} s_2 [c(x(t_N)) - 0.5]^3 & \text{if } c(x(t_N)) - 0.5 > 0 \\ 0 & \text{if } c(x(t_N)) - 0.5 \leq 0. \end{cases} \quad (32)$$

The parameters $s_1$ and $s_2$ are the strengths assigned each constraint. The penalty functions (31) and (32) are twice continuously differentiable. The objective (25) with the constraints (27) and (28) can be approximated to arbitrary precision by using the new objective (30) without constraints. The penalty function formulation resulted in negligible constraint violations of typically less than 0.001%.

The following are the results. Piece-wise continuous control was applied to several different modeled regions of increasing size. The smallest region, 1500 meters by 900 meters, was modeled with 77 nodes. The largest covered 4350 meters by 2850 meters and was modeled with 600 nodes (FIG. 2). The range of sizes allows a comparison of the present invention to related art approaches which were applied to the same sized regions[25].

A remediation clean-up time of 2.5 years with 10 management periods each 91.25 days long was chosen. The time integrations were conducted using super-time-stepping[33]. The length of the super-time-steps was 18.25 days. The number of inner steps was 4. The present invention was allowed to select between 64 wells for each mesh size. The present invention, however, is not limited to 64 wells—any number of wells can be used. Sparsity was exploited using simple sparse multiplication whenever objects to be multiplied are sparse.

For comparison, the related art method dDDP/SALQR was used with 64 wells, 10 management periods each 91.25 days long, and implicit-time integration. Sparsity was exploited in the dDDP/SALQR method in the same way it was exploited in the present invention. The implicit time stepping dDDP/SALQR method in Table 2 was the fastest related art method.

For further comparison, the related art method cDDP was used with a clean-up time of 2.5 years. No management periods were used because the cDDP method cannot incorporate management periods. The performances for the cDDP method is given in [25] and is reproduced here for comparison to the present invention. The cDDP method was allowed to select well locations from all active nodes for each mesh.

TABLE 2

Computational Work: operations per iteration required by PWC control verses dDDP/SALQR and cDDP in units of 1 billion. NA indicates cases not run due to too high a computational effort

| Design Method | Design problem size: number of nodes mesh | | | | | | | |
|---|---|---|---|---|---|---|---|---|
| | 77 | 160 | 216 | 280 | 320 | 414 | 500 | 600 |
| cDDP | 0.861 | 10.01 | 26.78 | NA | NA | NA | NA | NA |
| dDDP/SALQR | 0.094 | 0.816 | 2.077 | 4.697 | 7.122 | 16.12 | 29.27 | NA |
| PWC | 0.106 | 0.455 | 0.841 | 1.452 | 1.912 | 3.327 | 4.920 | 7.280 |

Table 2 indicates that the present invention requires less operations per iteration than the related art for problems exceeding 80 nodes. The advantage increases with larger problems. This is a distinct advantage because field applications can involve many thousands of nodes. A least squares fit (Table 3) indicates just how much faster we can expect the present invention to run verses the related art for larger problems. Using Table 3, the computational effort for the present invention will be 1/65 the effort required by the related art dDDP/SALQR method for a 10,000 node application and 1/384 the effort for a 50,000 node application (common sized field problems). For even larger problems, the present invention will have an even greater advantage. Note that in this comparison the present invention is more accurate as well as faster than the best related art method. The present invention's time step of 18.25 days results in higher accuracy than the 91.5 day time step used with dDDP/SALQR.

TABLE 3

Computational Work: operations per iteration required by PWC control verses dDDP/SALQR and cDDP: asymptotic computational effort

| Design Method | Asymptotic Computational effort $n$ = Number of state variables |
|---|---|
| cDDP | $2756n^{2.78}$ |
| dDDP/SALQR | $487.4n^{2.65}$ |
| PWC | $28,410n^{1.78}$ |

Memory usage, in addition to computational effort, can severely limit the usefulness of optimal remediation methods. The only related art continuous-time method, cDDP, is severely limited by memory usage[25]. The present continuous-time invention does not have this limitation. The memory usage of the present invention is less than the memory usage of both the related art SALQR/dDDP and cDDP methods. Table 4 presents a comparison of the memory usages of the present invention to the related art.

E. Three-Dimensional Finite Element Model

The present invention was applied to a three-dimensional finite element model to further

TABLE 4

Memory required by PWC control verses dDDP/SALQR and cDDP in units of 1 million bytes. NA indicates cases not run due to too high a computational effort.

| Design Method | Design problem size: number of nodes mesh | | | | | | | |
|---|---|---|---|---|---|---|---|---|
| | 77 | 160 | 216 | 280 | 320 | 414 | 500 | 600 |
| cDDP | 31.2 | 162 | 320 | NA | NA | NA | NA | NA |
| dDDP/SALQR | 1.07 | 3.69 | 6.36 | 10.3 | 13.3 | 21.9 | 31.8 | NA |
| PWC | 1.02 | 2.88 | 4.57 | 6.98 | 8.71 | 13.6 | 19.0 | 26.6 | demonstrate its effectiveness and versatility. A three-dimensional flow and transport model was constructed to solve two coupled partial differential equations which describe three-dimensional groundwater flow and transport[34] (see Table 5 for notation). Groundwater flow was assumed to obey:

$$S_g \frac{\partial h}{\partial t} - \nabla(K \cdot \nabla h) + \sum_{i \in Q} q_i \delta(\hat{x}_i, \hat{y}_i, \hat{z}_i) = 0. \quad (33)$$

Contamination transport was assumed to obey:

$$\frac{\partial}{\partial t}(\theta c) - \nabla(\theta D \cdot \nabla c) + \nabla \cdot (cv) = 0 \text{ where } v = -K \cdot \nabla h \quad (34)$$

The dispersion tensor was assumed to have the form[34]:

$$D_{ii} = \alpha_L \frac{v_i^2}{|v|} + \alpha_T \frac{|v|^2 - v_i^2}{|v|} + D^* \quad i = 1, 2, 3 \quad (35)$$

$$D_{ij} = D_{ji} = (\alpha_L - \alpha_T)\frac{v_i v_j}{|v|} \quad j \neq i, \; i, j \in \{1, 2, 3\} \quad (36)$$

TABLE 5

3D Flow and transport model variables

| | |
|---|---|
| $a_T$ | Transverse dispersivity (L) |
| $a_L$ | Longtidunal dispersivity (L) |
| c | dissolved contaminant concentration (M/L$^3$) |
| D | hydrodynamic dispersion tensor (L$^2$/T) |
| D* | coefficient of molecular dispersion (L$^2$/T) |
| $\delta(\hat{x}_i, \hat{y}_i, \hat{z}_i)$ | three-dimensional Dirac delta function centered at $(\hat{x}_i, \hat{y}_i, \hat{z}_i)$ |
| $(\hat{x}_i, \hat{y}_i, \hat{z}_i)$ | Coordinantes (location) of well i (L) |
| $q_i$ | pumping rate for well i located at $(\hat{x}_i, \hat{y}_i, \hat{z}_i)$ (L$^3$/T) |
| h | hydraulic head (L) |
| K | hydraulic conductivity tensor (L/T) |
| $S_s$ | general storage (L$^{-1}$) |
| $\theta$ | porosity |
| v | Darcy velocity defined as v = $-K \cdot \nabla h$ (L/T). |

The governing equations (33)–(36) were discretized in space using 8 node linear hexahedral serendipity elements and the Galerkin finite element method. The divergence theorem was used to reduce basis derivatives to first order. Element integrations are performed in local coordinates using Gaussian quadrature. The model supports both Neuman and Dirichlet boundary conditions.

Figure 5A:
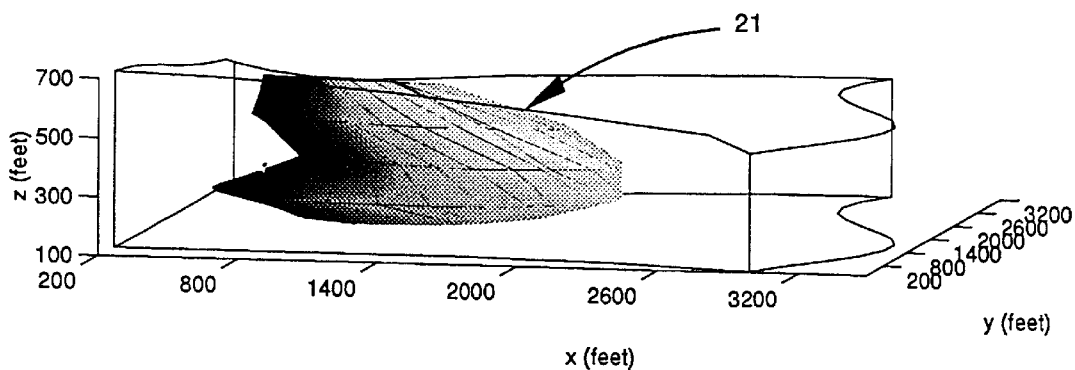
FIGS. 5a, 5b and 5c are a series of three perspective views of the contaminated volume inside the modeled region used in the three-dimensional example of a preferred embodiment of the present invention.
Figure 5B:
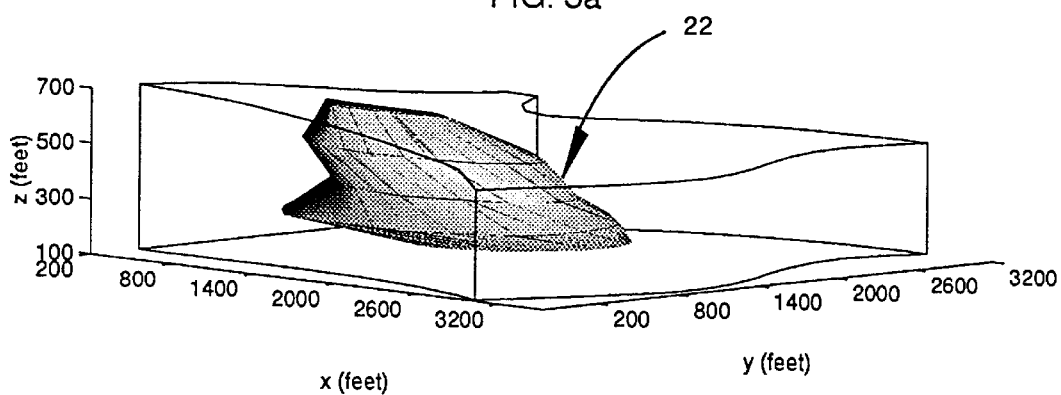
Figure 5C:
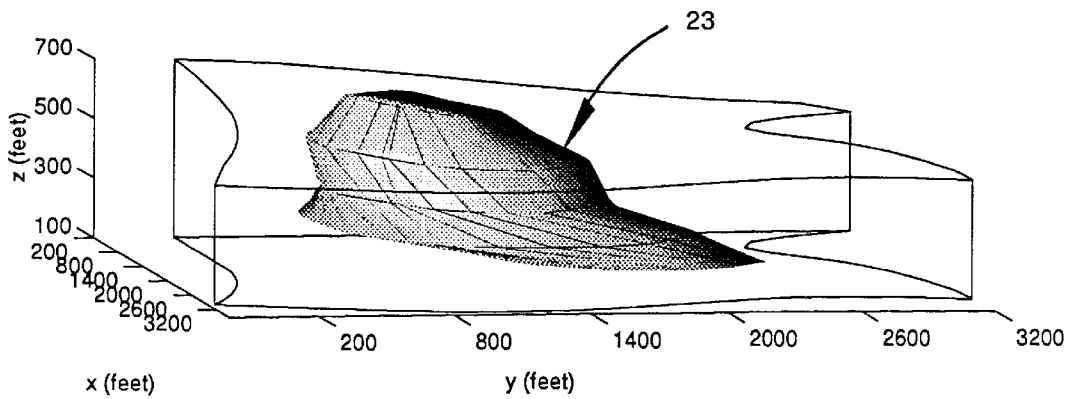

The present invention was applied to the following remediation problem: Consider the region presented in FIG. 3. A conservative contaminant has escaped into the groundwater in the middle of the top surface of the bounded area 17, which is bounded on two sides by the lake shore 18 and stream 19. The contamination has spread over time to the volumes 21, 22 and 23, indicated by FIGS. 5a, 5b and 5c. The goal is to reduce the contamination to a safe level of 0.35 μgm/l in the most cost efficient manner.

Figure 3:
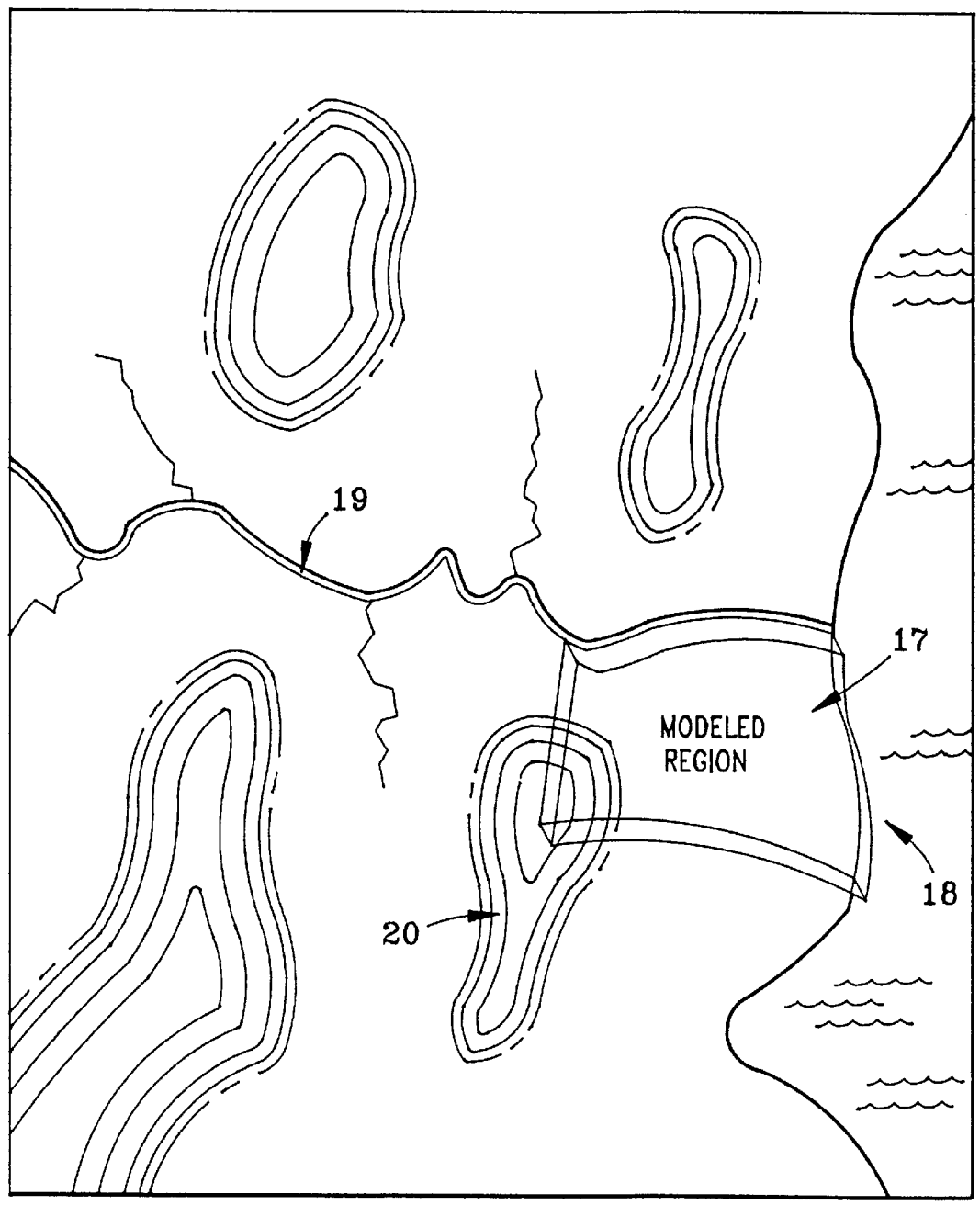
FIG. 3 is a representation of an aerial view of the land around a contaminated groundwater site which is remediated in the three-dimensional example of a preferred embodiment of the present invention.
Figure 4:
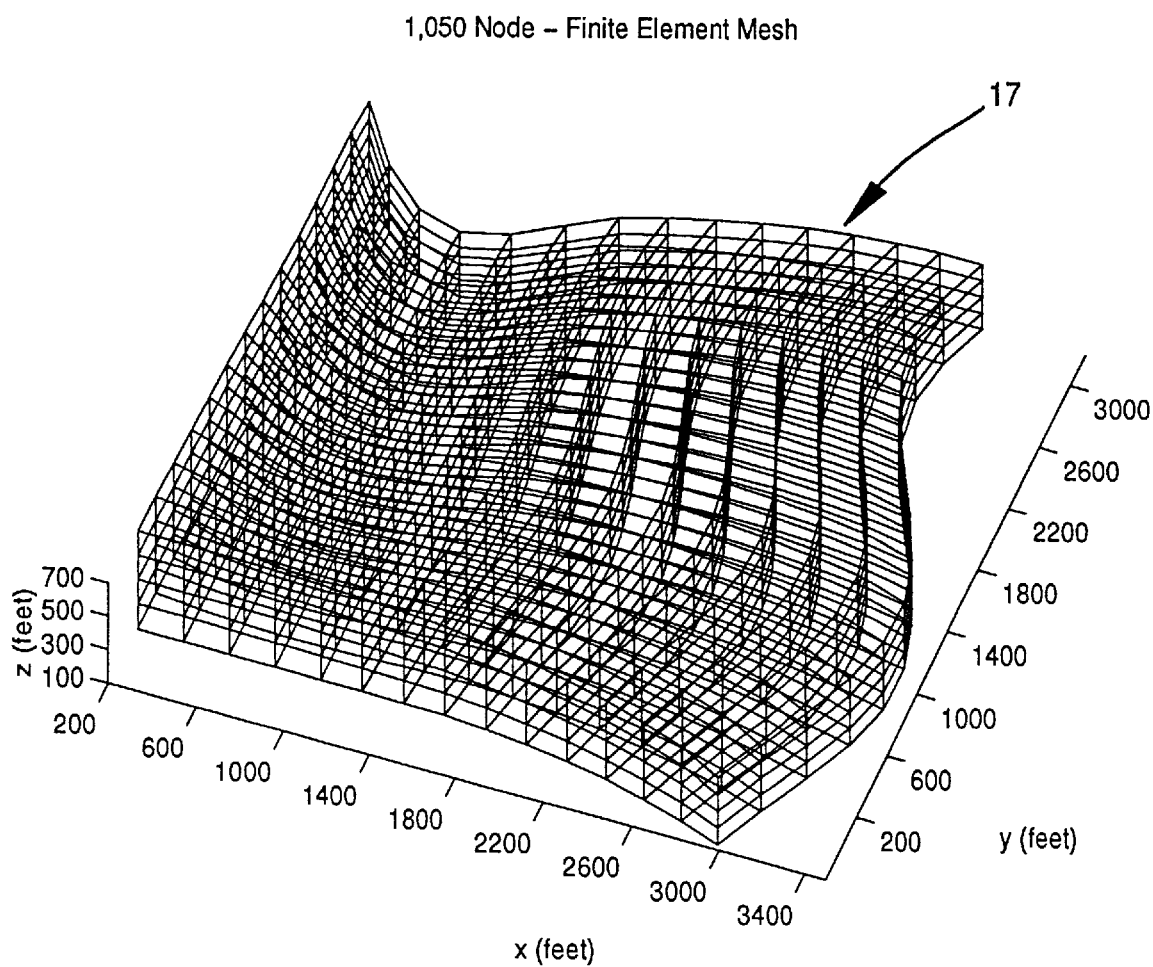
FIG. 4 is a perspective view of the computational mesh used in the three-dimensional example of a preferred embodiment of the present invention.

The region 17 of interest is an irregularly shaped volume roughly 3200×3200 ×400 cubic feet. The lake shoreline 18 and the inlet stream 19 are incorporated as Dirichlet head conditions. A 200 foot high hill 20, as shown in FIG. 3, is also in the region. A total of 1,050 nodes forming 728 finite elements of varying sizes and shapes were used to model the volume—see FIG. 4. The hydraulic conductivity was assumed to be inhomogeneous, corresponding to varying hydro-geologic conditions in the modeled volume. Spatially variable (inhomogeneous) conductivity is a common occurrence in nature. Inhomogeneous conductivity greatly increases the complexity of finding the most efficient design.

The state variables, x(t), for this example are the hydraulic heads h and the dissolved contamination concentration c at each non-Dirichlet node. The total number of state variables (state dimension) is n=1,820 for this example.

Figure 6:
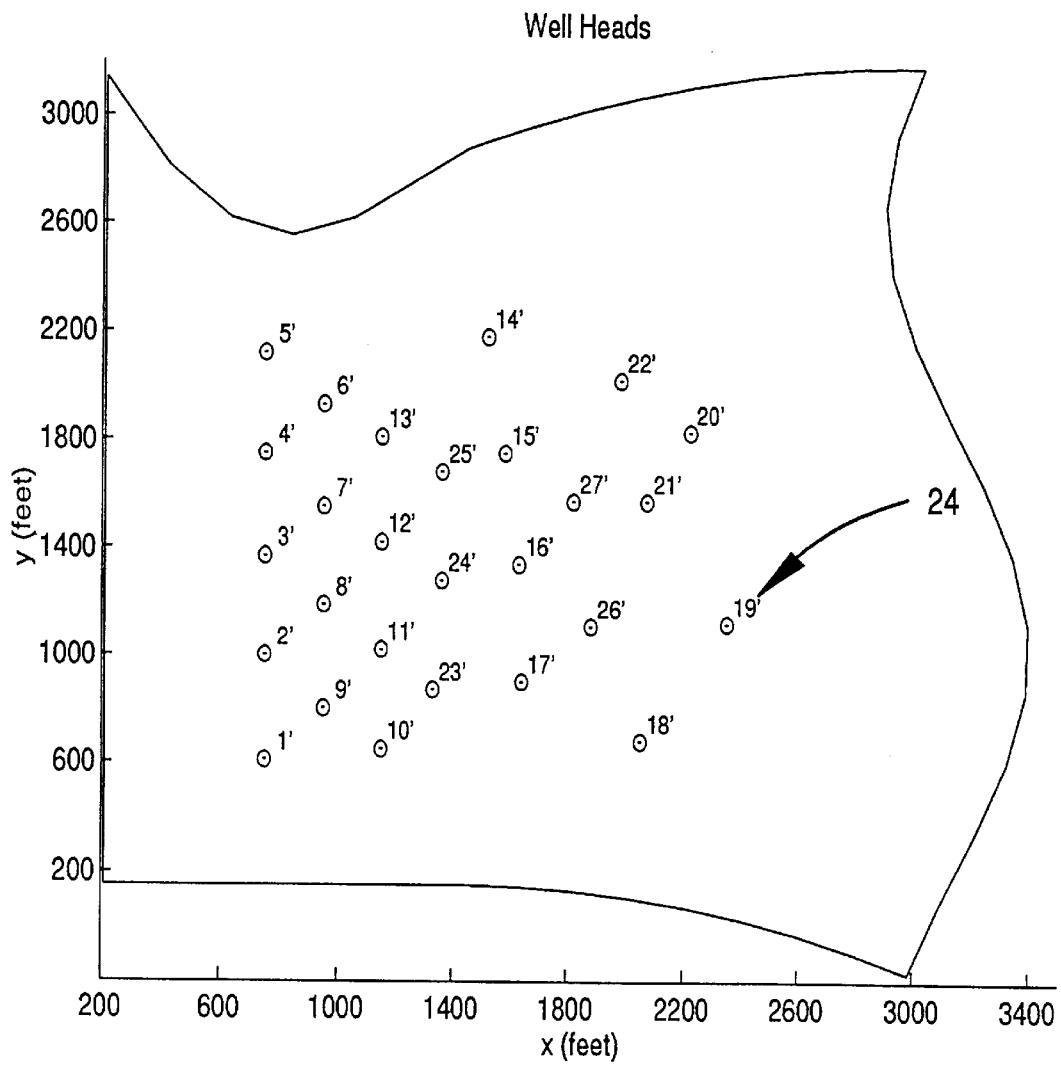
FIG. 6 depicts a plan view of the modeled region and possible device (e.g. well head) locations for the three-dimensional example.
Figure 7:
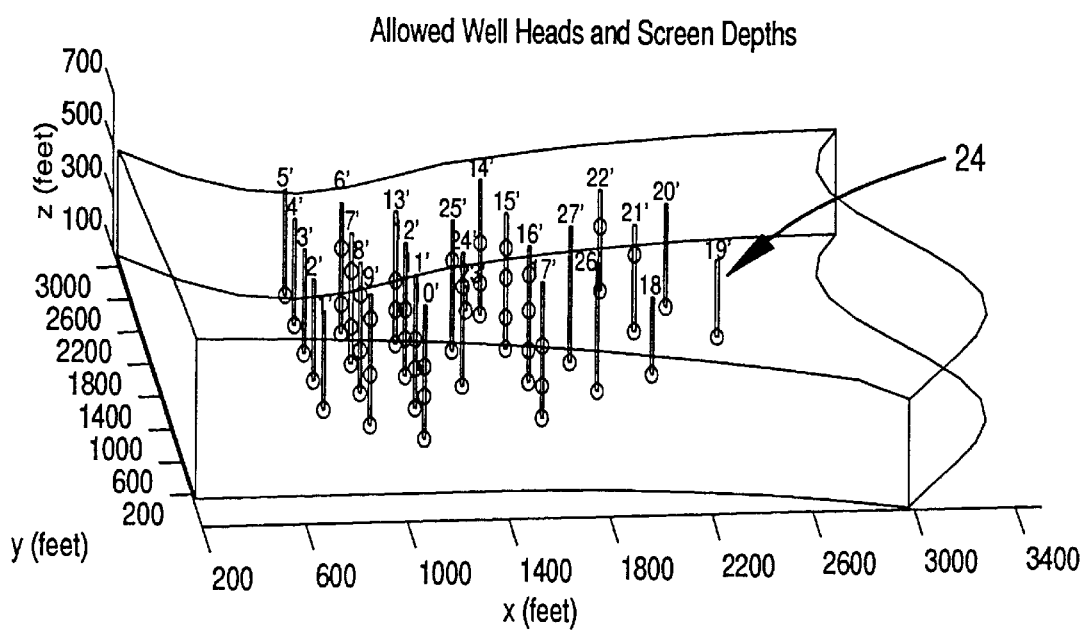
FIG. 7 depicts a perspective view of the modeled region and possible device (e.g. well head) locations with screen depths for the three-dimensional 1,050 node example.

The design variables are the pumping rates for extraction wells located at user allowed locations (anywhere inside the modeled region). The allowed possible well locations 24 (1'–27') used in this example are shown in FIGS. 6 and 7. Other devices such as injection wells, observation wells, slurry walls, infiltration caps, soil vapor extractors, air spargers, bioventors, and water treatment plants may also be represented at 24. The coordinates of the wells are given in Table 6. Note the number and location of candidate wells is entirely up to the user of the invention. More wells will ensure a better solution. The number of possible well locations in this example (including screen depths) is 57. Pumping rates (and hence well locations) are required to be fixed for the duration of each management period to ensure the design is practical. In this example, the design variables are equal to the control parameters (see (11)).

The pumping rates for this example correspond to extraction rates so we must constrain the pumping rates to be zero or positive (negative implies injection). A clean-up constraint of 0.35 micrograms per liter maximum concentration is required through out the region at the end of the remediation.

The objective function in this example approximates a cost index. The cost index has two components: the first component is a maintenance and operation cost which rises approximately quadratically with increasing pumping rates, and the second component is a fixed cost approximation. A fixed cost corresponds to the initial cost of installing the well equipment before it is turned on.

One criticism of related art gradient based or non-heuristic methods is that they call for many inefficient low flow or "trickle wells." This occurs because the cost of operating these wells is artificially low when construction fixed costs are neglected. When fixed costs are incorporated (as in this example with the present invention) low flow or trickle wells are not selected because the cost index correctly renders them very costly inefficient. In the present example, the 57 possible well locations will not incur a fixed cost unless the wells are selected for operation by piece-wise continuous control (i.e. unless a pumping rate>0 is specified for a given candidate well, it is assumed the well is not built). An accurate cost index for remediation must include fixed costs, which most (non-heuristic) related art methods do not incorporate.

The following design problem formulation is considered: Find the design $\upsilon(t)$ which minimizes the objective, $$J^* = \min_v J = \min_v \sum_{i=1}^{N} \int_{t_{i-1}}^{t_i} v(\tau)^\dagger \cdot v(\tau) d\tau + fc \cdot \delta(v(t_i) > 0). \quad (37)$$

The parameter $fc$ is a fixed cost incurred whenever a well is used (installed). The delta function $\delta(\upsilon(t_i)>0)$ returns the number of wells in operation during management period $i$.

The objective is to be minimized subject to the prediction of the 3D groundwater flow and transport model, $$\frac{dx(t)}{dt} = T(x(t), v(t), t)x(t = t_0) = x_{initial}, \quad (38)$$

and constraints:

$$\upsilon(t) \geq 0 \; t \in (t_0, t_N) \quad (39)$$

$$c(t_N) \leq 0.35 \; \mu\text{gm per liter.} \quad (40)$$

The design is required to be constant during each management period according to (11).

TABLE 6

Allowed well locations and screen depths

| Well | x-coord | y-coord | z-coord | Well | x-coord | y-coord | z-coord |
|---|---|---|---|---|---|---|---|
| 1 | 750 | 610 | 280 | 31, 35, 39, 42 | 1580 | 1750 | 140, 260, 410, 520 |
| 2 | 750 | 1000 | 270 | 32, 36, 40, 43 | 1630 | 1340 | 140, 260, 410, 545 |
| 3 | 750 | 1370 | 260 | 33, 37, 41 | 1640 | 900 | 140, 260, 410 |
| 4 | 750 | 1750 | 250 | 44 | 2050 | 680 | 360 |
| 5 | 750 | 2120 | 250 | 45 | 2350 | 1120 | 360 |
| 6, 10, 14 | 950 | 1930 | 160, 270, 480 | 46 | 2220 | 1830 | 260 |
| 7, 11, 15 | 950 | 1550 | 160, 300, 510 | 47 | 2070 | 1570 | 250, 540 |
| 8, 12, 16 | 950 | 1190 | 160, 320, 530 | 48, 50 | 1980 | 2020 | 270, 510 |
| 9, 13, 17 | 950 | 800 | 160, 350, 560 | 51 | 1330 | 870 | 560 |
| 18, 22, 26 | 1150 | 650 | 150, 310, 420 | 52, 55 | 1360 | 1280 | 525, 150 |
| 19, 23, 27 | 1150 | 1020 | 150, 300, 410 | 53, 54 | 1360 | 1680 | 500, 160 |
| 20, 24, 28 | 1150 | 1420 | 150, 290, 400 | 56 | 1880 | 1110 | 170 |
| 21, 25, 29 | 1150 | 1810 | 150, 280, 390 | 57 | 1818 | 1570 | 140 |
| 30, 34, 38 | 1520 | 2180 | 140, 260, 410 | | | | |

The objective function or cost index (37) is much more complex than in the two-dimensional example because it includes a fixed cost. The complexity of the objective indicates the versatility of the present invention. For a detailed discussion of the objective function used to approximate the nonconvex and discontinuous function (37), see Appendix C. The constraints (39)–(40) were incorporated into the objective using two penalty functions $\psi_1$ and $\psi_2$:

$$J^* = \min_v J = \min_v \sum_{i=1}^{N} \int_{t_{i-1}}^{t_i} [v(\tau)^\dagger v(\tau) + \Psi_1(v(\tau))] d\tau + \quad (41)$$
$$fc \cdot \delta(v(t_i) > 0) + \Psi_2(x(t_N))$$

The penalty function $\psi_1$ is defined by (88). The penalty function $\psi_2$ is defined by (32). The duration of the cleanup was chosen to be 2.4 years. Eight management periods each 109.5 days long where used. Super-time-step acceleration[33] was used for both the forward and backward integrations. A super-time-step equal in length to the management period (109.5 days) was used with twelve inner steps. A zero pumping policy was used to start the iterations of piece-wise continuous control. The loss, J, associated with a zero pumping policy is 627; 540. This loss is due entirely to the penalty $\psi_2$ for leaving the system contaminated at the end of the 2.4 year clean-up. The iterative process of piece-wise continuous control reduced the loss according to Table 7.

The optional design is found rapidly and the corresponding objective is 26,859. The optimal policy leaves the entire region with contamination concentrations less than or equal to the maximum safe standard of 0.35 $\mu$gm/l. The wells and corresponding pumping rates used in the optimal design are given in Table 8. It is important to emphasize that the design specified by Table 8 can never be obtained using an educated guess or trial and error. This design represents a mathematically best design out of an infinite set of possible designs for a complex, contaminated groundwater system defined by the finite element model. The trial and error

TABLE 7

Iterative reduction of the objective for the 3D case

| Iteration | Loss |
|---|---|
| 0 | 627,540 |
| 1 | 601,191 |
| 2 | 575,926 |
| 3 | 455,972 |
| 4 | 341,188 |
| 5 | 192,469 |
| 6 | 104,614 |
| 7 | 68,927 |
| 8 | 51,488 |
| 9 | 40,208 |
| 10 | 30,398 |
| 11 | 28,949.2 |
| 12 | 28,242.2 |
| 13 | 27,587.2 |
| 14 | 27,183.2 |
| 15 | 27,055.0 |
| 16 | 26,971.5 |
| 17 | 26,859.2 | and educated guess approaches can generate designs which achieve the clean-up goal but at much greater expense (typically 5 times higher pumping cost for this example).

In summary, the piece-wise continuous control of groundwater remediation provides a versatile and highly cost-efficient means for remediating groundwater. In addition, the design procedure is substantially less computationally demanding than the two closest procedures in the related art (see Tables 3 and 4). Table 3 indicates the computational effort for the present invention is 1/95 of that needed by the related art dDDP/SALQR method for a 10,000 node application. The advantage improves for larger problems. For example, the present invention requires less than 1/384 of the related art effort for a 50,000 node application. Note also that in the comparison of Tables 3 and 4, the present invention is used with a shorter, more accurate time step. The related art dDDP/SALQR method requires a longer (and hence less accurate) time step to be computationally efficient.

The three dimensional example demonstrates the effectiveness of the present invention with full dimension models. The advantage of the present invention is best realized when

TABLE 8

Optimal well locations and operating rates

| Well # | Management Period | | | | | | | |
|---|---|---|---|---|---|---|---|---|
| | 1 | 2 | 3 | 4 | 5 | 6 | 7 | 8 |
| 8 | 2.307 | 1.914 | 1.31 | 0 | 0 | 0 | 0 | 0 |
| 9 | 1.785 | 1.293 | 0 | 0 | 0 | 0 | 0 | 0 |
| 12 | 2.043 | 2.853 | 0 | 0 | 0 | 0 | 0 | 0 |
| 16 | 3.933 | 2.765 | 2.051 | 0 | 0 | 0 | 0 | 0 |
| 17 | 2.513 | 2.674 | 2.132 | 1.397 | 0 | 0 | 0 | 0 |
| 18 | 3.462 | 3.113 | 2.161 | 0 | 0 | 0 | 0 | 0 |
| 19 | 3.838 | 3.913 | 3.781 | 3.393 | 2.681 | 1.464 | 0 | 0 |
| 20 | 2.87 | 2.875 | 2.336 | 1.719 | 0 | 0 | 0 | 0 |
| 22 | 1.544 | 1.446 | 1.456 | 0 | 0 | 0 | 0 | 0 |
| 23 | 4.547 | 4.027 | 3.59 | 3.452 | 3.195 | 2.406 | 1.274 | 0 |
| 24 | 3.375 | 3.593 | 3.185 | 2.748 | 2.461 | 2.135 | 0 | 0 |
| 27 | 4.985 | 4.25 | 3.371 | 2.794 | 2.546 | 1.969 | 1.003 | 0 |
| 28 | 3.914 | 3.448 | 2.789 | 2.216 | 1.764 | 1.346 | 0 | 0 |
| 29 | 2.884 | 0 | 0 | 1.51 | 0 | 0 | 0 | 0 |
| 31 | 2.661 | 1.165 | 0 | 0 | 0 | 0 | 0 | 0 |
| 32 | 5.716 | 4.764 | 4.176 | 3.59 | 3.064 | 2.404 | 1.404 | 0 |
| 33 | 5.786 | 6.165 | 4.55 | 3.644 | 2.506 | 1.447 | 0 | 0 |
| 35 | 2.495 | 2.509 | 1.789 | 0 | 0 | 0 | 0 | 0 |

TABLE 8-continued

Optimal well locations and operating rates

| Well # | Management Period | | | | | | | |
|---|---|---|---|---|---|---|---|---|
| | 1 | 2 | 3 | 4 | 5 | 6 | 7 | 8 |
| 36 | 0 | 4.689 | 4.401 | 4.237 | 3.963 | 3.263 | 2.23 | 0 |
| 37 | 2.015 | 3.108 | 2.681 | 2.374 | 1.871 | 1.345 | 0 | 0 |
| 39 | 0 | 1.468 | 1.73 | 1.807 | 0 | 0 | 0 | 0 |
| 40 | 4.761 | 4.491 | 4.383 | 3.607 | 2.639 | 1.937 | 0 | 0 |
| 41 | 4.04 | 3.748 | 2.542 | 1.39 | 0 | 0 | 0 | 0 |
| 43 | 6.058 | 4.818 | 2.917 | 1.258 | 0 | 0 | 0 | 0 |
| 45 | 3.295 | 1.237 | 0 | 0 | 0 | 0 | 0 | 1.149 |
| 47 | 7.16 | 6.236 | 5.253 | 1.934 | 0 | 0 | 0 | 0 |
| 51 | 7.461 | 5.619 | 3.191 | 0 | 0 | 0 | 0 | 0 |
| 52 | 6.568 | 6.719 | 6.488 | 5.468 | 3.592 | 1.924 | 0 | 0 |
| 54 | 2.555 | 1.938 | 1.127 | 0 | 0 | 0 | 0 | 0 |
| 55 | 4.552 | 4.662 | 4.626 | 4.699 | 4.68 | 4.179 | 2.465 | 0 |
| 56 | 11.62 | 9.878 | 9.656 | 7.924 | 5.624 | 3.256 | 2.1 | 1.332 |
| 57 | 5.103 | 4.339 | 3.38 | 2.05 | 0 | 0 | 0 | 0 | using a three dimensional model. The reason for this is that the problem of finding highly efficient remediation designs is substantially more complex when vertical variability is considered. The potential for the present invention to identify highly efficient designs which are highly unobvious to conventional methods is greatly increased in three dimensions.

Although the description and examples above contain many specificities, these should not be construed as limiting the scope of the invention, but merely providing illustrations of some of the presently preferred embodiments of this invention. For example, although both examples consider extraction wells and certain associated variables, many other common remediation devices and many other variables can also be considered. Common devices include injection wells, nutrient injection systems for bioremediation, surfactant injection systems, directional wells, air sparging equipment, hydraulic conductivity altering methods such as slurry walls, vitrification, and hydro or pneumatic fracturing, vapor extraction devices, surfactant injection wells, dual phase extraction, and hot water or steam flushing. Moreover, as discussed, the groundwater models used in conjunction with this invention are not limited to the two examples given. This invention can be used equally well with any differentiable groundwater contamination and/or biodegradation model. Such models include, but are not limited to, finite difference, finite element, finite volume, analytic, boundary element, transform, neural network, and spectral method models. Further, the present invention can be used with minor modifications well known in art, such as super-time-stepping[33], Quasi Newton approximations[35], Hessian shifting[36], SALQR approximation[9], adaptive integration, implicit-time integration, iterative equation solvers, bang-bang optimization[16], non-convex objective functions (Appendix C), sparse operations, and multi-grid methods[37].

APPENDIX A

Theory of Piece-wise Continuous Control

Consider optimal control problems of the following general formulation:

$$J^* = \min_v J = \min_v \int_{t_0}^{t_N} F(x(\tau), v(\tau), \tau)d\tau + \sum_{i=1}^{N} G(x(t_i), v(t_i), t_i), \quad (42)$$

subject to the continuous-time state equation, $$\frac{dx(t)}{dt} = T(x(t), v(t), t) \quad x(t = t_0) = x_{initial}. \quad (43)$$

The design variables $v$ are constrained to be continuous parametric functions over N specified time intervals called "management periods":

$$v(t) = \begin{vmatrix} f_1(u_1, t) & \text{for } t = t_0 \text{ to } t_1 \\ f_2(u_2, t) & \text{for } t = t_1 \text{ to } t_2 \\ \vdots & \vdots \\ f_N(u_N, t) & \text{for } t = t_{N-1} \text{ to } t_N. \end{vmatrix} \quad (44)$$

The parameters $\mu_i \in \Re^m$ are called the "control." The control defines the continuous vector functions $f_i$. It is assumed $f_i$ is twice continuously differentiable with respect to $\mu_i$. The state $\chi(t) \in \Re^n$ is a continuous function of time. The management period time intervals $(t_{j-1}, t_j)$, $j=1, 2, \ldots, N$, the number of periods N, and the form of the parametric functions $f$ may be chosen arbitrarily. It is assumed that F, G, and T are twice continuously differentiable with respect to state $\chi$ and control $\mu$.

Piece-Wise Continuous Control Motivation

The following derivation is necessary to begin the motivation for piece-wise continuous control. Consider the OCP formulation (42)–(44). Define $J(\chi, \mu_N, t)$ for $t \in (t_{N-1}, t_N)$ to be the future, not necessarily optimal, objective value accumulated for beginning in state $\chi$ at time t, and using control value $\mu_N$ from time t to $t_N$:

$$J(x, u_N, t) \stackrel{\Delta}{=} \int_t^{t_N} F(x(\tau), f_N(u_N, \tau), \tau)d\tau + G(x(t_N), f_N(u_N, t_N), t_N) \quad (45)$$

It follows by this definition that it can be written, $$J(x, u_N, t) = \int_t^{t+\Delta t} F(x(\tau), f_N(u_N, \tau), \tau)d\tau + J(x(t+\Delta t), u_N, t+\Delta t). \quad (46)$$

Consider a Taylor series expansion of $J(\chi(t+\Delta t), \mu_n, t+\Delta t)$ about the time t:

$$J(\chi(t+\Delta t),\mu_N, t+\Delta t)=J(\chi(t),\mu_N,t)+J_t\Delta t+J^+_\chi \dot{\chi}\Delta t+J^+_\mu \dot{\mu}\Delta t+O(\Delta t^2), \quad (47)$$

where $J_t$, $J_\chi$, and $J_\mu$ are partial derivatives of J with respect to t, $\chi$, and $\mu$. The derivative $\dot{\mu}$ is zero because the control is constant in time for the interval $(t_{N-1}, t_N)$. We notice $\dot{\chi}$ is already defined as $T(\chi, f_N(\mu_N,t),t)$ by (43) so we can write:

$$J(\chi(t+\Delta t),\mu_N,t+\Delta t)=J(\chi(t),\mu_N,t)+J_t\Delta t+J^+_\chi T\Delta t+O(\Delta t^2) \quad (48)$$

If we substitute (48) into (46) and cancel $J(\chi(t),\mu_N,t)$ appearing on the left and right hand sides, we obtain:

$$-J_t(x, u_N, t)\Delta t = \int_t^{t+\Delta t} F(x(\tau), f_N(u_N, \tau), \tau)d\tau + J^+_x(x, u_N, t)T(x, f_N(u_N, t), t)\Delta t + O(\Delta t^2). \quad (49)$$

Next divide by $\Delta t$ and let $\Delta t \to 0$:

$$-J_t(\chi,\mu_N,t)=F(\chi,\mu_N,t)+J_\chi(\chi,\mu_N,t)^+T(\chi,f_N(\mu_N,t),t). \quad (50)$$

The right-hand side of (50) is often called the Hamiltonian function. Using (50) we can obtain a system of (adjoint) ordinary differential equations which describe J, $J_\chi$, $J_\mu$, $J_{\chi\chi}$, $J_{\chi\mu}$, and $J_{\mu\mu}$ as functions of time where subscripts denote partial derivatives. We can use these equations to calculate updates using only derivatives of $f$, F, and G. To obtain these equations simply differentiate (50) with respect to $\chi$ and $\mu$ to obtain:

$$-J_{t\chi}=F_\chi+J_{\chi\chi}T+T^+_\chi J_\chi \quad (51)$$

$$-J_{t\mu}=F_\mu+J^+_{\chi\mu}T+T^+_\mu J_\chi \quad (52)$$

$$-J_{t\chi\chi}=F_{\chi\chi}+J_{\chi\chi\chi}T+J_{\chi\chi}T_\chi+T^+_\chi J_{\chi\chi}+J_\chi T_{\chi\chi} \quad (53)$$

$$-J_{t\chi\mu}=F_{\chi\mu}J_{\chi\mu\chi}T+J_{\chi\chi}T_\mu+T^+_\chi J_{\chi\mu}+J_\chi T_{\chi\mu} \quad (54)$$

$$-J_{t\mu\mu}=F_{\mu\mu}+J_{\mu\mu\chi}T+J^+_{\chi\mu}T_\mu+T^+_\mu J_{\chi\mu}+J_\chi T_{\mu\mu}. \quad (55)$$

where, for instance, $J_\chi T_{\chi\chi} \equiv \Sigma^n_{i=1} J_\chi(i) T(i)_{\chi\chi}$, and $T(i)_{\chi\chi}$ is the Hessian of the $i^{th}$ component of T, and $J_\chi(i)$ is the $i^{th}$ component of the gradient vector $J_\chi$. To obtain an integrable system of equations, we need the total time derivatives of J, $J_\chi$, $J_\mu$, $J_{\chi\chi}$, $J_{\chi\mu}$, and $J_{\mu\mu}$. The total time derivative of J is:

$$\dot{J}=J_t+J^+_\chi T. \quad (56)$$

Similarly, $$\dot{J}_\chi=J_{\chi t}+J_{\chi\chi}T \quad (57)$$

$$\dot{J}_\mu=J_{\mu t}+J^+_{\chi\mu}T \quad (58)$$

$$\dot{J}_{\chi\chi}=J_{\chi\chi t}+J_{\chi\chi\chi}T \quad (59)$$

$$\dot{J}_{\chi\mu}=J_{\chi\mu t}+J_{\chi\mu\chi}T \quad (60)$$

$$\dot{J}_{\mu\mu}=J_{\mu\mu t}+J_{\mu\mu\chi}T. \quad (61)$$

If we substitute (50) through (55) into (56) through (61) we obtain the following expressions for the total derivatives:

$$\dot{J}=-F \quad (62)$$

$$\dot{J}_\chi=-F_\chi-T^+_\chi J_\chi \quad (63)$$

$$\dot{J}_\mu=-F_\mu-T^+_\mu J_\chi \quad (64)$$

$$\dot{J}_{\chi\chi}=-F_{\chi\chi}-J_{\chi\chi}T_\chi-T^+_\chi J_{\chi\chi}-J_\chi T_{\chi\chi} \quad (65)$$

$$\dot{J}_{\chi\mu}=-F_{\chi\mu}-J_{\chi\chi}T_\mu-T^+_\chi J_{\chi\mu}-J_\chi T_{\chi\mu} \quad (66)$$

$$\dot{J}_{\mu\mu}=-F_{\mu\mu}-J^+_{\chi\mu}T_\mu-T^+_\mu J_{\chi\mu}-J_\chi T_{\mu\mu} \quad (67)$$

Equations (62)–(67) along with the terminal conditions, $$J(\chi(t_N),\mu_N,t_N)=G(\chi(t_N),f_N(\mu_N,t_N),t_N)$$

$$J_\chi(\chi(t_N),\mu_N,t_N)=G_\chi(\chi(t_N),f_N(\mu_N,t_N),t_N)$$

$$J_\mu(\chi(t_N),\mu_N,t_N)=G_\mu(\chi(t_N),f_N(\mu_N,t_N),t_N)$$

$$J_{\chi\chi}(\chi(t_N),\mu_N,t_N)=G_{\chi\chi(\chi(tN)},f_N(\mu_N,t_N),t_N)$$

$$J_{\chi\mu}(\chi(t_N),\mu_N,t_N)=G_{\chi\mu}(\chi(t_N),f_N(\mu_N,t_N),t_N)$$

$$J_{\mu\mu}(\chi(t_N),\mu_N,t_N)=G_{\mu\mu}(\chi(t_N),f_N(\mu_N,t_N),t_N) \quad (68)$$

provide a means to calculate the first and second order partial derivatives of J with respect to $\chi$ and $\mu$ at any time t $\epsilon(t_{N-1},t_N)$. In particular, calculate these derivatives at time $t_{N-1}$ by integrating the terminal value problem backward in time from time $t_N$.

We can now calculate an update based on a quadratic approximation to the original OCP at time $t_{N-1}$. Let $\bar{\mu}$ denote a nominal policy. Let $\bar{\chi}(t)$ denote the corresponding state trajectory, we can write.

$$J(x(t_{N-1}), u_N, t_{N-1}) = J(\bar{x}(t_{N-1}), \bar{u}_N, t_{N-1}) + \quad (69)$$

$$J_x(\bar{x}(t_{N-1}), \bar{u}_N, t_{N-1})^\dagger \delta x + J_u(x(t_{N-1}), \bar{u}_N, t_{N-1})^\dagger \delta u_N +$$

$$\frac{1}{2}\delta x^\dagger J_{xx}(\bar{x}(t_{N-1}), \bar{u}_N, t_{N-1})\delta x + \delta x^\dagger J_{xu}(\bar{x}(t_{N-1}), \bar{u}_N, t_{N-1})\delta u_N +$$

$$\frac{1}{2}\delta u_N^\dagger J_{uu}(\bar{x}(t_{N-1}), \bar{u}_N, t_{N-1})\delta u_N + \text{higher order terms.}$$

where $\delta\mu_N{}^\Delta=\mu_N-\bar{\mu}_N$, and $\delta\chi^\Delta=\chi(t_{N-1})-\bar{\chi}(t_{N-1})$. If the Hessian $J_{\mu\mu}$ is positive and definite, we can minimize the quadratic part of the expansion (69) for an arbitrary state $\chi(t_{N-1})$ by requiring the gradient of the quadratic part with respect to control $\mu_N$ be zero:

$$0=J_\mu+J^+{}_{\chi\mu}\delta\chi+J_{\mu\mu}\delta\mu_N \quad (70)$$

We can solve (70) for $\delta\mu_N$ to obtain an update for $\mu_N$ given $\chi(t_{N-1})$:

$$\delta\mu_N=-J^{-1}{}_{\mu\mu}J^+{}_{\chi\mu}\delta\chi-J^{-1}{}_{\mu\mu}J_\mu \quad (71)$$

The derivatives of J are evaluated at time $t_{N-1}$, using the nominal state trajectory $\bar{\chi}$, and nominal control $\bar{\mu}_N$. If we define $\eta_N{}^\Delta=-J^{-1}{}_{\mu\mu}J^+{}_{\chi\mu}$ and $\gamma_N{}^\Delta=-J^{-1}{}_{\mu\mu}J_\mu$ then we can write (71) as $$\delta\mu_N=\eta_N\delta\chi+\gamma_N. \quad (72)$$

If we substitute (71) into the quadratic expansion (69) and collect terms we can obtain the quadratic return function which is a function only of state $\delta\chi$. The quadratic return function $J^*(\chi(t_{N-1}),t_{N-1})$ is the minimum value of the quadratic part of $J(\chi(t_{N-1}),\mu_N,t)$ with respect to $\mu_N$, given an arbitrary state $\chi(t_{N-1})$:

$$J^*(\chi(t_{N-1}),t_{N-1})=J-\tfrac{1}{2}J^+{}_\mu J^{-1}{}_{\mu\mu}J_\mu+(J^+{}_\chi-J^+{}_\mu$$

$$J^{-1}{}_{\mu\mu}J^+{}_{\chi\mu})\delta\chi+\tfrac{1}{2}\delta\chi^+(J_{\chi\chi}-J_{\chi\mu}J^{-1}{}_{\mu\mu}J^+{}_{\chi\mu})\delta\chi \quad (73)$$

If we define $$P^\Delta=J_{\chi\chi}-J_{\chi\mu}J^{-1}{}_{\mu\mu}J^+{}_{\chi\mu} \quad (74)$$

$$Q^{+\Delta}=J^+{}_\chi-J^+{}_\mu J^{-1}{}_{\mu\mu}J^+{}_{\chi\mu} \quad (75)$$

$$R^\Delta=J-\tfrac{1}{2}J^+{}_\mu J^{-1}{}_{\mu\mu}J_\mu \quad (76)$$

then we can write (73) as $$J^*(\chi(t_{N-1}),t_{N-1})=R+Q^+\delta\chi+\tfrac{1}{2}\delta\chi^+P\delta\chi. \quad (77)$$

Using (77), we can proceed to calculate an update for the next to last time period $(t_{N-2},t_{N-1})$ during which the control value is $\mu_{N-1}$. Define for $t \in (t_{N-2},t_{N-1})$, $$J(x(t), u_{N-1}, t) \stackrel{\Delta}{=} \int_t^{t_{N-1}} F(x(\tau), f_{N-1}(u_{N-1}, \tau), \tau)d\tau + \quad (78)$$

$$G(x(t_{N-1}), f_{N-1}(u_{N-1}, t_{N-1}), t_{N-1}) + J^*(x(t_{N-1}), t_{N-1}).$$

Analogous to (45)–(68), J defined by (78) and its first and second derivatives can be evaluated by integrating equations (62)–(67) backward in time from $t_{N-1}$ to t, subject to the terminal $$J(\chi(t_{N-1}),\mu_{N-1},t_{N-1})=G(\chi(t_{N-1}),f_{N-1}(\mu_{N-1},t_{N-1}),t_{N-1})+R$$

$$J_{102}(\chi(t_{N-1}),\mu_{N-1},t_{N-1})=G_\chi(\chi(t_{N-1}),f_{N-1}(\mu_{N-1},t_{N-1}),t_{N-1})+Q$$

$$J_\mu(\chi(t_{N-1}),\mu_{N-1},t_{N-1})=G_\mu(\chi(t_{N-1}),f_{N-1}(\mu_{N-1},t_{N-1}),t_{N-1})$$

$$J_{\chi\chi}(\chi(t_{N-1}),\mu_{N-1},t_{N-1})=G_{\chi\chi}(\chi(t_{N-1}),f_{N-1}(\mu_{N-1},t_{N-1}),t_{N-1})+P$$

$$J_{\chi\mu}(\chi(t_{N-1}),\mu_{N-1},t_{N-1})=G_{\chi\mu}(\chi(t_{N-1}),f_{N-1}(\mu_{N-1},t_{N-1}),t_{N-1})$$

$$J_{\mu\mu}(\chi(t_{N-1}),\mu_{N-1},t_{N-1})=G_{\mu\mu}(\chi(t_{N-1}),f_{N-1}(\mu_{N-1},t_{N-1}),t_{N-1}) \quad (79)$$

Thus, if we use (62)–(67) and (79), we can calculate J and its derivatives at time $t_{N-2}$. Analogous to the update (71) for $\mu_N$ we have an update for $\mu_{N-1}$:

$$\delta\mu_{N-1}=-J^{-1}{}_{\mu\mu}J^+{}_{\chi\mu}\delta\chi(t_{N-2})-J^{-1}{}_{\mu\mu}J_\mu. \quad (80)$$

where $\delta\chi(t_{N-2})^\Delta=\chi(t_{N-2})-\bar{\chi}(t_{N-2})$ and $\delta\mu_{N-1}{}^\Delta=\mu_{N-1}-\bar{\mu}_{N-1}$. Equivalently we can define $\eta_{N-1}{}^\Delta=-J^{-1}{}_{\mu\mu}J^+{}_{\chi\mu}$ and $\gamma_{N-1}{}^\Delta=-J^{-1}{}_{\mu\mu}J_\mu$ then $$\delta\mu_{N-1}=\eta_{N-1}\delta\chi(t_{N-2})+\gamma_{N-1}. \quad (81)$$

The derivatives of J in (81) are evaluated at time $t_{N-2}$, using the nominal state trajectory $\bar{\chi}$, and nominal control $\bar{\mu}$.

The update coefficients $(\gamma_i,\eta_i)$ can be defined for each time period, $(t_{N-3},t_{N-2}),(t_{N-4},t_{N-3}), \ldots, (t_0,t_1)$. The updates can then be used to improve the nominal design. Unlike dDDP, the state values between the times $t_1,t_2,\ldots,t_N$ are allowed to explicitly affect the objective function.

APPENDIX B

Step Acceptance Criteria

It is recommended that $\Delta R$ be used to yield insight into the local geometry of your optimal control problem. A knowledge of local properties will speed up global convergence.

The step acceptance criteria (21) is based on the expected quadratic reduction. The expression for the expected quadratic reduction in the objective value $$\left(\frac{\epsilon^2}{2}-\epsilon\right)\Delta R$$

is obtained by substituting $\delta u_N=\eta_N\delta x+\epsilon\gamma_N$ where $\eta N=-J_{uu}{}^-1J_{xu}{}^t$ and $\gamma_N=-J_{uu}{}^{-1}J_u$ into the quadratic expansion (69). If we collect terms, we obtain $$J(x(t_{N-1}), \epsilon, t_{N-1}) = J - \left(\frac{\epsilon^2}{2}-\epsilon\right)J_u^\dagger J_{uu}^{-1}J_u + \quad (82)$$

$$(J_x^\dagger - J_u^\dagger J_{uu}^{-1}J_{xu}^\dagger)\delta x + \frac{1}{2}\delta x^\dagger(J_{xx} - J_{xu}J_{uu}^{-1}J_{xu}^\dagger)\delta x.$$

Note that when $\epsilon=1$ then $J(x(t_{N-1}),\epsilon,t_{N-1})=J^*(x(t_{N-1}),t_{N-1})$ as defined by equation (73). If we define $$R(\epsilon) = J - \left(\frac{\epsilon^2}{2} - \epsilon\right) J_u^t J_{uu}^{-1} J_u,$$

then we can write (82) as $$J(x(t_{N-1}),\epsilon,t_{N-1}) = R(\epsilon) + Q^t \delta x + \tfrac{1}{2} \delta x^t P \delta x. \tag{83}$$

where $Q^t = J_x^{\,t} - J_u^{\,t} J_{uu}^{-1} J_{xu}^{\,t}$ and $P = J_{xx} - J_{xu} J_{uu}^{-1} J_{xu}^{\,t}$ are independent of $\epsilon$. In an analogous fashion one can recursively derive expressions for $J(x(t_1),\epsilon,t_0)$ will be $$J(x(t_0), \epsilon, t_0) = J(t_0) - \sum_{i=0}^{N-1} \left(\frac{\epsilon^2}{2} - \epsilon\right) J_u^t(t_i) J_{uu}^{-1}(t_i) J_u(t_i) \tag{84}$$

where $J(t_0)$ is the objective value obtained by using the nominal policy $\bar{u}$. The derivatives $J_u(t_i)$ and $J_{uu}^{-1}(t_i)$ are evaluated using the nominal policy $\bar{u}$ and the nominal state trajectory $\bar{x}$. The linear and quadratic terms of (83) do not contribute because $\delta x(t_0)$ is identically zero. This is because the initial state must be given and fixed $x(t_0) = \bar{x}(t_0) = x_{initial}$. The calculation of $\Delta R \equiv \Sigma_{i=0}^{N-1} J_u^{\,t}(t_i) J_{uu}^{-1}(t_i) J_u(t_i)$ is performed in Step 3 of piece-wise continuous control. A good convergence criteria is to stop when a full $\epsilon=1$ step yields a reduction in the objective of almost exactly $$\frac{\Delta R}{2}.$$

APPENDIX C

Discussion of the Cost Index Used in the 3D Example

The cost index (37) used in the three dimensional remediation example presents two problems for gradient based (non-hueristic) optimization methods. The first is that the function is not continuous. Gradient based methods require continuity of the objective and the first two derivatives. The second problem arises when the first problem is eliminated by using a steep continuous function to replace the discontinuity. The second problem is that any steep continuous function approximately the fixed cost $\delta(v>0)$ must be non-convex. Non-convex objectives will cause gradient based methods to fail unless modified.

This appendix presents the steep continuous function used to replace the fixed cost discontinuity and the technique used to modify piece-wise continuous control to work with the resulting non-convex objective function.

First consider the fixed cost index function (37) in one dimension (i.e. the control dimension is m=1 and it is straight forward to generalize to dimension m>1):

$$cost(u) = d \cdot u^2 + \delta(u>1) \cdot fc \tag{85}$$

where fc is the "fixed cost" (a constant) and $\delta(u>0)=1$ when $u>0$ else $\delta(u>0)=0$. The constant d is a scale parameter for the quadratic part of the cost index. The discontinuity of cost (u) at u=0 can be represented using a steep continuous exponential function of the form:

$$f(u) = \frac{1}{1 + e^{\frac{-u+b}{a}}} \tag{86}$$

The constants a and b in (86) are shape and shift parameters for the fixed cost approximation. For the purposes of optimization we want our objective to have zero slope and be convex at u=0. The following function constructed using f(u) satisfies these criteria:

$$g(u) \triangleq f(u) \cdot (d \cdot u^2 + fc) - fc \cdot f'(0) \cdot u \quad u \geq 0 \tag{87}$$

The term f'(0) is the first derivative of (86) at u=0. It is straight forward to link the function g(u) defined for $u \geq 0$ to a cubic penalty function for u<0. When we link a cubic penalty to (87) we require the continuity of the function and its first two derivatives at u=0. The penalty used in the 3D example to enforce the positivity of the pumping rates is $$\psi_1(u) = -cu^3 + \tfrac{1}{2} g''(0) \cdot u^2 + g(0) \quad u < 0 \tag{88}$$

The constant c in (88) is a shape parameter for the function $\psi_1$.

The objective function defined by $$CI(u) \triangleq \begin{cases} g(u) & u \geq 0 \\ \psi_1(u) & u < 0 \end{cases} \tag{89}$$

is continuous to order 2 as required by the present invention. However, CI(u) is not everywhere convex. To remedy this problem, the following approach was used.

Let $u_1$ denote the current iteration value of the control. If $u_1$ is a point such that $$\frac{d^2 CI(u_1)}{du^2} > 0,$$

then use piece-wise continuous control unmodified. If $$\frac{d^2 CI(u_1)}{du^2} \leq 0,$$

then use piece-wise continuous control unmodified except substitute a positive value $c_m$ in place of $$\frac{d^2 CI(u_1)}{du^2}$$

when evaluating the derivative $F_{uu}$ which appears in (16). To arrive at a value for $c_m$ consider a general convex quadratic model of CI(u) at the point $u_1$:

$$cq(u) = a_m + b_m(u-u_1) + \tfrac{1}{2} c_m (u-u_1)^2. \tag{90}$$

We require that the value and slope of cq match CI at the point $u_1$ (note CI, defined by (89), can be non-convex only when u>0):

$$cq(u) = g(u_1) + g'(u_1)(u-u_1) + \tfrac{1}{2} c_m (u-u_1)^2 \tag{91}$$

Assuming that g is strictly monotonic increasing for u>0 and $u_1>0$ it follows that $g'(u_1)>0$. Thus any convex quadratic fit will have a minima to the left of $u_1$. The curvature, $c_m$, establishes the minimum value of cq and the location of the minima, $u_{min}$.

First, a good model will not have a minima located $u_{min}<0$ because we know that the global minima of CI is at u=0. Second, we known by the assumption that g is strictly greater than zero for u>0 that any good model minima should not be less than zero. Third, we want to require $c_m$ be large enough positive ($>c_{min}$) to avoid numerical problems such as non-positive definite stage-wise Hessians piece-wise continuous control) and/or lengthy line searches. To summarize:

(1) Choose $c_m$ s.t. $\min_u cq(u) \geq 0$, (2) Choose $c_{m\ s.t.}$ $0 \leq u_{min} < u_1$, and (3) Choose $c_m$ s.t. $c_{m>cmin}$.

The third requirement is problem dependent. A good value for $c_{min}$ must be discovered for each case. For example, using piece-wise continuous control, the stage-wise Hessians $J_{uu}$ can fail to be positive definite due to integration accuracy when the convexity $$\frac{\partial^2 F}{\partial u^2}$$

is too small. One way to "discover" a value for $c_{min}$ is to replace $$\frac{\partial^2 F}{\partial u^2}$$

with smaller positive test values until a single backward sweep results in non-positive definite stage-wise Hessians $J_{uu}$.

Now consider the implications of the three requirements listed above. The minima of cq occurs at the point:

$$u_{\min} = u_1 - \frac{g'(u_1)}{c_m}. \tag{92}$$

Define the "Newton distance", ND, to be the distance from $u_1$ to the minima $u_{min}$:

$$ND \triangleq u_1 - u_{min}, \tag{93}$$

then $$c_m = \frac{g'(u_1)}{ND}.$$

The first requirement, $\min_u cq(u) \geq 0$, can be restated. By substitution of $u_{min}$ into (91) we find the minimum value of cq is $$cq(u_{\min}) = g(u_1) - \frac{g'(u_1)^2}{2c_m} = g(u_1) - \frac{g'(u_1) \cdot ND}{2} \tag{94}$$

We want $cq(u_{min}) \geq 0$ so $$ND \leq \frac{2g(u_1)}{g'(u_1)} \tag{95}$$

For requirement number 2, choose $c_m$ s.t. $0 \leq u_{min} < u_1$, is the requirement that ND should be less than or equal to the distance between u=0 and the point $u_1$. Thus, requirement number 2 is $$ND \leq u_1. \tag{96}$$

Requirement number 3 is $$c_{\min} < c_m = \frac{g'(u_1)}{ND}.$$

This implies that $$ND < \frac{g'(u_1)}{c_{\min}}.$$

To apply this model we can simply calculate $$ND_1 \triangleq \frac{2g(u_1)}{g'(u_1)} \quad ND_2 \triangleq u_1 \quad ND_3 \triangleq \frac{g'(u_1)}{c_{\min}} \tag{97}$$

and let $ND=\min(ND_1, ND_2, ND_3)$ then $$c_m = \frac{g'(u_1)}{ND}.$$

Then the convex model at the non-convex or nearly non-convex point $u_1$ is $$cq(u) = g(u_1) + g'(u_1)(u - u_1) + \frac{1}{2}\frac{g'(u_1)}{ND}(u - u_1)^2. \tag{98}$$

In practice, replace the true second derivative of the non-convex objective function with $c_m$ whenever the true second derivative g" (u)$<c_{min}$. The first derivative remains unchanged. The following shape parameter values and fixed cost used in the 3D finite element example: a=0.06, b=0.4, c=$5 \times 10^{-5}$, d=$4 \times 10^{-7}$, and fc=94.60.

Another approach to approximating fixed costs is as follows. Augment the state with additional state variables—one corresponding to each remediation device/location. Define the state equation for the additional state variables such that the state (initially zero) becomes irreversibly non-zero when the device corresponding to that state variable is operated. Assign an end cost $G(x(t_N),t_N)$ (as part of the objective) to include a fixed cost approximation whenever the additional state variables $x(t_N) \neq 0$. The fixed cost approximation can be similar to the one outlined in this Appendix.

APPENDIX D

Several Examples of Piece-wise Continuous Control Dynamics

This appendix briefly describes a few of the many different types of design variable dynamics allowed by the present invention. Recall the relation between the design variables, v(t), and the control variables, $u_i$, is:

$$v(t) = \begin{vmatrix} f_1(u_1, t) & \text{for } t = t_0 \text{ to } t_1 \\ f_2(u_2, t) & \text{for } t = t_1 \text{ to } t_2 \\ \vdots & \vdots \\ f_N(u_N, t) & \text{for } t = t_{N-1} \text{ to } t_N \end{vmatrix} \tag{99}$$

The simplest design variable dynamics is the static design formulation given by (11). A single control parameter is used to describe each design variable. A plot of a design variable obeying (11) is given in FIG. 8.

For a second example, suppose that the design variable v describes a "on or off" remediation device such as a single rate pump. Let the constant a denote the single rate. The design question is how long and when should the device be on during each management period? A suitable formulation of this question for piece-wise continuous control uses two control parameters $u^1$ and $u^2$ for each design variable v:

$$v(t) = f_i(u_i^1, u_i^2) = \begin{vmatrix} 0 & when\ t_{i-1} \leq t < (u_i^1)^2 \\ a & when\ (u_i^1)^2 \leq t \leq (u_i^2)^2 \\ 0 & when\ (u_i^2)^2 < t \leq t_i \end{vmatrix} \quad (100)$$

The formulation (100) along with the constraint, $0 \leq u_i^1 \leq u_i^2 \leq \sqrt{t_i - t_{i-1}}$ are admissible design dynamics for the present invention. The squaring of the control parameters $u_i^1$ and $u_i^2$ in (100) aid convergence. An example design of this type is plotted in FIG. 9a.

Next, consider a "pulsed operation" design. A pulsed operation is successive on and off operation of remediation devices. Pulsed operation can in some circumstances enhance remediation efficiency by taking advantage of chemical equilibrium kinetics. A design question is: suppose the devices are to be pulsed 3 times during each management period, at what rate and how long should the devices be on during each pulse? A suitable formulation for piece-wise continuous control requires only two control parameters $u^1$ and $u^2$ (if the pulse frequency is also considered, then more control parameters are needed). Define Δ to be one third of the length of a management period, then $$v(t) = f_i(u_i^1, u_i^2) = \begin{vmatrix} u_i^2 & when\ t_{i-1} \leq tt_{i-1} + \leq u_i^1 \\ 0 & when\ t_{i-1} + u_i^1 < t < t_{i-1} + \Delta \\ u_i^2 & when\ t_{i-1} + \Delta \leq t \leq t_{i-1} + \Delta + u_i^1 \\ 0 & when\ t_{i-1} + 2\Delta \leq t \leq t_{i-1} + 2\Delta \\ u_i^2 & when\ t_{i-1} + 2\Delta \leq t \leq t_{i-1} + 2\Delta + u_i^1 \\ 0 & when\ t_{i-1} + 2\Delta + u_i^1 < t \leq t_i \end{vmatrix} \quad (101)$$

with the constraint $0 \leq u_i^1 \leq \Delta$ are admissible design dynamics for the present invention. An example design of this type is plotted in FIG. 9b.

As a final example, suppose that the design variable v may change quadratically in time during each management period. The design question is: what should the quadratic equation be for each management period? A suitable formulation of this for piece-wise continuous control uses three parameters $u^1$, $u^2$, and $u^3$:

$$v(t) = f_i(u_i^1, u_i^2, u_i^3) = u_i^1 \cdot t^2 + u_i^2 \cdot t + u_i^3 \text{ when } t_{i-1} \leq t \leq t_i \quad (102)$$

An example design of this type is plotted in FIG. 9c.

REFERENCES

[1] Dougherty, D. E. and R. A. Marryott, Optimal groundwater management 1. Simulated Annealing, *Water Resources Research*, 27(10), pp 2493–2508, 1991.

[2] Marryott, R. A., D. E. Dougherty, and R. L. Stollar, Optimal groundwater management 2. Application of simulated annealing to a field-scale contamination site, *Water Resources Research*, 29(4), pp847–860, 1993.

[3] McKinney, D. C., and M-D Lin, Genetic algorithm solution of groundwater management models, *Water Resources Research*, 30(6), pp 1897–1906, 1994.

[4] Ritzel, B. J., and J. W. Eheart, Using genetic algorithms to solve a multiple objective groundwater pollution containment problem, *Water Resources Research*, 30(5), pp 1589–1603, 1994.

[5] Rogers L. L., and F. U. Dowla, Optimization of groundwater remediation using artificial neural networks with parallel solute transport modeling. *Water Resources Research*, 30(2), pp 457–481, 1994.

[6] Harvey, C. F., R. Haggerty, and S. M. Gorelick, Aquifer remediation: a method for estimating mass transfer rate coefficients and an evaluation of pulsed pumping, *Water Resources Research*, 30(7), pp 1979–1991, 1994.

[7] Atwood, D. F. and S. M. Gorelick, Hydraulic gradient control for groundwater contaminant removal, *Journal of Hydrology*, 76, pp 85–106, 1985.

[8] Ahlfeld, D. P., Two-stage groundwater remediation design, *Journal of Water Resource Planning and Management*, 116(4), pp 517–529, 1990.

[9] Chang, L-C., C. A. Shoemaker, and P. L-F. Liu, Application of a constrained optimal control algorithm to groundwater remediation, *Water Resources Research*, 28(12), pp 3157–3173, 1992.

[10] Culver, T., and C. A. Shoemaker, Dynamic optimal control for groundwater remediation with flexible management periods, *Water Resources Research*, 28(3), pp 629–641, 1992.

[11] McKinney, D. C., and M-D Lin, Approximate mixed-integer nonlinear programming methods for optimal aquifer remediation design, *Water Resources Research*, 31(3), pp 731–740, 1995.

[12] Murtagh, B. A. and M. A. Saunders, MINOS/AUGMENTED user's manual, *Systems Optimization Laboratory Tech. Rep.* 80-14, 51 pages, Dept. of Oper. Res., Stanford University, Stanford, Calif., 1980.

[13] Voss, C. I., SUTRA: A finite element simulation model for saturated-unsaturated fluid-density-dependent groundwater flow with energy transport or chemically reactive single species solute transport, *U.S. Geological Survey Resource Investment*, 1984.

[14] Gorelick, S. M., C. I. Voss, P. E. Grill, W. Murray, M. A. Saunders, and M. H. Wright, Aquifer reclamation design: The use of contaminant transport simulation combined with nonlinear programming, *Water Resources Research*, 20(4), pp 415–427, 1984.

[15] Mayne D. Q., A second-order gradient method for determining optimal trajectories of nonlinear discrete-time systems, *International Journal of Control*, 3(1), pp 85–95, 1966.

[16] Jacobson D. H., and D. Q. Mayne, *Differential Dynamic Programming*, Elsevier Scientific, New York, N.Y., 1970.

[17] Andricevic, R. and P. K. Kitanidis, Optimization of the pumping schedule in aquifer remediation under uncertainty, *Water Resources Research*, 26(5), pp 875–885, 1990.

[18] Lee, S-I., and P. K. Kitanidis, Optimal estimation and scheduling in aquifer remediation with incomplete information, *Water Resources Research*, 27(9), pp 2203–2217, 1991.

[19] Culver, T., and C. A. Shoemaker, Optimal control for groundwater remediation by Differential Dynamic Programming with quasi-Newton approximation, *Water Resources Research*, 29(4), 823–831, 1993.

[20] Willis, R. A planning model for the management of groundwater quality, *Water Resources Research*, 15(6), pp 1305–1312, 1979.

[21] Gorelick, S. M., and I. Remson, Optimal dynamic management of groundwater pollutant sources, *Water Resources Research*, 18(1), pp 71–76, 1982.

[22] Gorelick, S. M., and I. Remson, Optimal location and management of waste disposal facilities affecting groundwater quality, *Water Resources Research*, 18(1), pp 43–51, 1982.

[23] Colurallo, S. J., M. Heidari, and T. Maddock III, Identification of an optimal groundwater management strategy in a contaminated aquifer, *Water Resources Bull.,* 20(5), pp 747–760, 1984.

[24] Jones, L. C., R. Willis, and W. W. Yeh, Optimal control of nonlinear groundwater hydraulics using differential dynamic programming, *Water Resources Research,* 23(11), pp 2097–2106, 1987.

[25] Whiffen, G. J., Optimal control for deterministic and uncertain groundwater remediation, Ph.D. dissertation, Chapter 3, Cornell University, Ithaca, N.Y., 1995.

[26] Ahlfeld, D. P., J. M. Mulvey, and G. F. Pinder, Designing optimal strategies for contaminated groundwater remediation, *Advances in Water Resources,* 9(2), pp 77–84, 1986.

[27] Ahlfeld, D. P., J. M. Mulvey, G. F. Pinder, and E. F. Wood, Contaminated groundwater remediation design using simulation, optimization, and sensitivity theory, 1, model development, *Water Resources Research,* 24(3), pp 431–441, 1988.

[28] Ahlfeld, D. P., J. M. Mulvey, G. F. Pinder, and E. F. Wood, Contaminated groundwater remediation design using simulation, optimization, and sensitivity theory, 2, Analysis of a field site, *Water Resources Research,* 24(3), pp 443–452, 1988.

[29] Karatzas, G. P., and G. F. Pinder, Groundwater management using numerical simulation and the outer approximation method for global optimization, *Water Resources Research,* 29(10), 3371–3378, 1993.

[30] Minsker, B. S., and C. A. Shoemaker, Differentiating a finite element biodegradation simulation model for optimal control, *Water Resources Research,* 32(1), pp 187–192, 1996.

[31] Patrick, R., E. Ford, and J. Quarles, *Groundwater Contamination in the United States,* second edition University of Pennsylvania Press, Philadelphia Pa., 1987.

[32] Kirkpatrick, S., C. D. Gelatt, and M. P. Vecchi, Optimization by simulated annealing, *Science,* 220(4598), pp 671–680, 1983.

[33] Alexiades, V., G. Amiez, and P-A Gremaud, Super-Time-Stepping Acceleration of Explicit Schemes for Parabolic Problems, *Communications in Numerical Methods in Engineering,* to appear, 1996.

[34] Segol, G., *Classic Groundwater Simulations Proving and Improving Numerical Models,* Prentice-Hall, Inc., Englewood Cliffs, N.J., pp 415–443, 1994.

[35] Sen, S. and S. J. Yakowitz, A quasi-Newton differential dynamic programming algorithm for discrete-time optimal control, *Automatica,* 23(6), pp 749–752, 1987.

[36] Liao, L-Z, and C. A. Shoemaker, Convergence in unconstrained discrete-time differential dynamic programming, *IEEE Trans. Autom. Control,* 36(6), pp 692–706, 1991.

[37] Bramble, J. H., Multigrid methods, Pitman Research Notes in Mathematical Series Number 294, Wiley & Sons, New York, N.Y., 1993.

What is claimed is:

1. An apparatus comprising:

a processing unit;

a memory system, said memory system being connected to said processing unit; and a program stored in said memory system for execution on said processing unit, said program including:

an optimization mechanism that optimizes remediation of a contaminated groundwater site by a minimization of a groundwater remediation design objective J with respect to a groundwater remediation design vector v(t), wherein t denotes time, wherein v(t) is a piecewise continuous function of t, wherein J is functionally dependent on both v(t) and a state vector x(t), and wherein dx(t)/dt and v(t) are functionally related by a differential equation of: dx/dt=T(x(t),v(t),t) subject to the condition of $x(t_0)=x_{initial}$.

2. The apparatus of claim 1 further comprising for use by said program:

site characterization information, design objective information, and design constraints.

3. The apparatus of claim 2, wherein the site characterization information includes:

contaminants and location of said contaminants at a contaminated groundwater site; and physical properties of said contaminated groundwater site including at least one of size, depth, topography, volume, materials, hydraulic conductivity, porosity, dispersivity, retardation, biological reactivity, hydraulic head, and recharge rates.

4. The apparatus of claim 2, wherein said design objective information includes information selected from at least one of: cost, cleanup time, contamination level, number of cleanup devices, and minimum flow rate from cleanup devices.

5. The apparatus of claim 1, further comprising, for use by said program, remediation cleanup devices including at least one of: extraction wells, slurry walls, infiltration caps, soil vapor extractors, air spargers, bioventors, and water treatment plants.

6. A program product comprising:

a recordable media; and a program recorded on said recordable media by a computer system for execution on a central processing unit, said program having:

an optimization mechanism that optimizes remediation of a contaminated groundwater site by a minimization of a groundwater remediation design objective J with respect to a groundwater remediation design vector v(t), wherein t denotes time, wherein v(t) is a piecewise continuous function of t, wherein J is functionally dependent on both v(t) and a state vector x(t), and wherein dx(t)/dt and v(t) are functionally related by a differential equation of: dx/dt=T(x(t),v(t),t) subject to the condition of $x(t_0)=x_{initial}$.

7. The apparatus of claim 1, wherein said optimization mechanism is subject to a twice-continuously differentiable constraint that functionally relates v(t), x(t) and t.

8. The apparatus of claim 1, wherein said optimization mechanism includes an integration of a system of coupled ordinary differential equations, and wherein said ordinary differential equations are linear.

* * * * *